(12) United States Patent
Ichihara

(10) Patent No.: US 9,673,736 B2
(45) Date of Patent: Jun. 6, 2017

(54) POWER CONVERSION SYSTEM AND POWER CONVERSION DEVICE

(71) Applicant: Mitsubishi Electric Corporation, Chiyoda-ku, Tokyo (JP)

(72) Inventor: Masafumi Ichihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/901,317

(22) PCT Filed: Sep. 5, 2014

(86) PCT No.: PCT/JP2014/073584
§ 371 (c)(1),
(2) Date: Dec. 28, 2015

(87) PCT Pub. No.: WO2016/035217
PCT Pub. Date: Mar. 10, 2016

(65) Prior Publication Data
US 2016/0211771 A1 Jul. 21, 2016

(51) Int. Cl.
*H02M 3/335* (2006.01)
*H02M 7/5395* (2006.01)
(Continued)

(52) U.S. Cl.
CPC .......... *H02M 7/5395* (2013.01); *H02M 1/08* (2013.01); *H02M 7/493* (2013.01); *H02M 2001/0009* (2013.01)

(58) Field of Classification Search
CPC .............. H02M 3/1584; H02M 7/493; H02M 2003/1586; Y10T 307/544
(Continued)

(56) References Cited

U.S. PATENT DOCUMENTS 5,436,823 A * 7/1995 Araki .................... H02M 7/493
307/51
5,546,298 A 8/1996 Rohner
(Continued)

FOREIGN PATENT DOCUMENTS

CN 101110518 A 1/2008
CN 103609012 A 2/2014
(Continued)

OTHER PUBLICATIONS

International Search Report of PCT/JP2014/073584 dated Dec. 9, 2014.
(Continued)

*Primary Examiner* — Rajnikant Patel
(74) *Attorney, Agent, or Firm* — Sughrue Mion, PLLC; Richard C. Turner

(57) ABSTRACT

A power conversion system includes a master power conversion device and one or more slave power conversion devices. Each power conversion device includes: a time counter and a carrier wave generator for synchronization with the time counter. The master power conversion device includes: a synchronization data generating unit for synchronizing a value of the time counter of the slave power conversion device with that of the master power conversion device. The slave power conversion device further includes: a time counter correcting unit that corrects the value of the time counter on the basis of the received synchronization data; a current sensor that detects a current on an output side of the slave power conversion device; and a gate timing adjusting unit that advances or delays a phase of the gate signal of the slave power conversion device.

10 Claims, 14 Drawing Sheets

(51) Int. Cl.
*H02M 7/493* (2007.01)
*H02M 1/08* (2006.01)
*H02M 1/00* (2006.01)

(58) Field of Classification Search
USPC ....... 323/272; 363/71–75, 65, 66, 95, 97, 98
See application file for complete search history.

(56) References Cited

U.S. PATENT DOCUMENTS

| | | | | |
|---|---|---|---|---|
| 5,973,485 | A * | 10/1999 | Kates | H02M 3/1584 323/272 |
| 6,809,678 | B2 * | 10/2004 | Vera | H02J 1/102 323/299 |
| 6,940,736 | B2 * | 9/2005 | Jonsson | H02M 3/1584 363/71 |
| 7,773,396 | B2 * | 8/2010 | Ollila | H02M 7/53873 318/801 |
| 8,077,193 | B2 * | 12/2011 | Tomioka | G02B 26/125 347/241 |
| 8,836,270 | B2 | 9/2014 | Kajiura et al. | |
| 8,964,431 | B2 | 2/2015 | Sato et al. | |
| 9,236,814 | B2 * | 1/2016 | Kaneko | H02M 7/493 |
| 2013/0135775 | A1 * | 5/2013 | Yao | H02H 9/025 361/18 |
| 2013/0141952 | A1 | 6/2013 | Kaneko | |
| 2014/0203756 | A1 | 7/2014 | Kajiura et al. | |

FOREIGN PATENT DOCUMENTS

| | | |
|---|---|---|
| JP | 60-98875 A | 6/1985 |
| JP | 1-110062 A | 4/1989 |
| JP | 6-261552 A | 9/1994 |
| JP | 7-298625 A | 11/1995 |
| JP | 7-308072 A | 11/1995 |
| JP | 10-112984 A | 4/1998 |
| JP | 10-225142 A | 8/1998 |
| JP | 2001-8489 A | 1/2001 |
| JP | 2001-37247 A | 2/2001 |
| JP | 2002-315350 A | 10/2002 |
| JP | 2003-219650 A | 7/2003 |
| JP | 2008125182 A | 5/2008 |
| JP | 2009-291007 A | 12/2009 |
| JP | 2011-10117 A | 1/2011 |
| JP | 2011-36045 A | 2/2011 |
| JP | 2013-118743 A | 6/2013 |
| JP | 5398380 B2 | 1/2014 |
| WO | 2011/039865 A1 | 4/2011 |
| WO | 2013/190609 A1 | 12/2013 |

OTHER PUBLICATIONS

Communication dated Dec. 7, 2016, from the State Intellectual Property Office of People's Republic of China in counterpart Application No. 201480047596.9.

* cited by examiner

| SWITCHING OF TARGET | INCREASING DIRECTION OF CURRENT Is | STATE | PHASE ADJUSTING DIRECTION OF GATE SIGNAL |
|---|---|---|---|
| L→H | POSITIVE | SLAVE IS CHANGED TO H TOO EARLY | DELAYING DIRECTION |
| L→H | NEGATIVE | SLAVE IS CHANGED TO H TOO LATE | ADVANCING DIRECTION |
| H→L | POSITIVE | SLAVE IS CHANGED TO L TOO LATE | ADVANCING DIRECTION |
| H→L | NEGATIVE | SLAVE IS CHANGED TO L TOO EARLY | DELAYING DIRECTION |

80

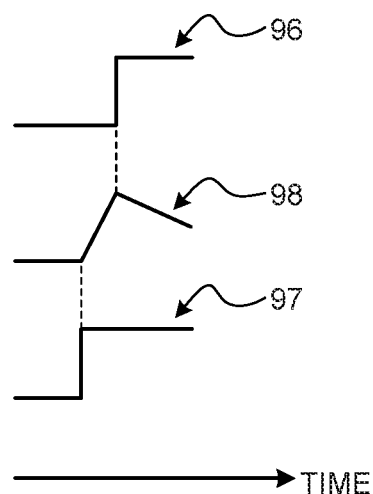
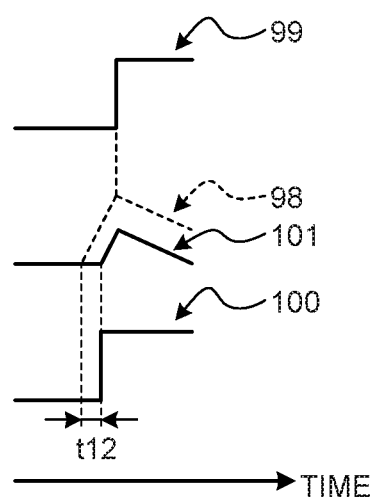

POWER CONVERSION SYSTEM AND POWER CONVERSION DEVICE

CROSS REFERENCE TO RELATED APPLICATIONS

This application is a National Stage of International Application No. PCT/JP2014/073584 filed Sep. 5, 2014, the contents of all of which is incorporated herein by reference in its entirety.

FIELD

The present invention relates to a power conversion system having a plurality of power conversion devices that operate in parallel.

BACKGROUND

As techniques of increasing capacity of a pulse width modulation (PWM) semiconductor power conversion device, known techniques include one technique in which the capacity of an individual PWM semiconductor power conversion device is increased and another technique in which the capacity is increased by connecting a plurality of PWM semiconductor power conversion devices in parallel. In the former one, since the capacity of a semiconductor device to be used has an upper limit, the increase in capacity is also limited. On the other hand, in the latter one, since the number of power conversion devices to be connected in parallel can be theoretically limitless, there is a merit that the number of power conversion devices can be increased hardly limitless in a practical range.

However, when PWM semiconductor power conversion devices are connected in parallel without any particular care, a so-called circulation current which is a current flowing among the PWM semiconductor power conversion devices increases because of asynchronism of PWM carrier waves of the PWM semiconductor power conversion devices, and thus a current output to a load decreases. That is, a current capacity utilization rate of the PWM semiconductor power conversion devices decreases. There is further a possibility that an overcurrent protection function will be activated to stop the PWM semiconductor power conversion devices. For addressing this, a technique is known to reduce a circulation current by inserting a reactor in an output line of the PWM semiconductor power conversion devices, which is disadvantageous in the installation area and cost. Accordingly, it is required to synchronize the PWM carrier waves of the PWM semiconductor power conversion devices connected, in parallel.

In consideration of the above-mentioned problem, the inventor of the present invention has proposed a PWM semiconductor power conversion system in which one PWM semiconductor power conversion device is set as a master, other PWM semiconductor power conversion devices are set as slaves, and a PWM carrier wave of the master PWM semiconductor power conversion device is synchronized with PWM carrier waves of the slave PWM semiconductor power conversion devices by transmitting a synchronization signal from the master PWM semiconductor power conversion device to the slave PWM semiconductor power conversion devices (see the following Patent Literature 1).

A parallel operation circuit of an inverter device is known in which a deviation current between an output current of a reference inverter device and output current of other inverter devices operating in parallel is detected, and in which the timing of arc-igniting/extinguishing signals of other inverter devices operating in parallel are advanced or delayed with respect to the arc-igniting/extinguishing signal of the reference inverter device such that the current difference is zero (see Patent Literature 2).

CITATION LIST

Patent Literature

Patent Literature 1: Japanese Patent No. 5398380
Patent Literature 2: Japanese Patent Application Laid-Open No. H1-110062

SUMMARY

Technical Problem

In the technique described in Patent Literature 1, the PWM carrier waves of the PWM semiconductor power conversion devices can be synchronized with each other. However, for example, when a switching element disposed in a stage subsequent to a PWM carrier wave generator or a circuit driving the switching element has an individual difference or has a characteristic variation due to an ambient environment such as temperature, there is a possibility that the PWM carrier waves will not be completely synchronized with each other and that a circulation current will be generated.

In the technique described in Patent Literature 2, current sensors corresponding to the number of inverter devices are required for the purpose of detecting the current difference between the output current of the reference inverter device and the output currents of other inverter devices operating in parallel. Further in the technique described in Patent Literature 2, wires for connecting the current sensors to a regulator are required which limits installation of the inverter devices. In the technique described in Patent Literature 2, when the number of inverter devices is greater than two, it is necessary to calculate the current differences between the output current of the reference inverter device and the output currents of a plurality of inverter devices, which is troublesome.

The present invention is made in consideration of the above-mentioned circumstances and an objective thereof is to provide a power conversion system and a power conversion device with a simple structure that can reduce a circulation current.

Solution to Problem

In order to solve the problem and achieve the objective mentioned above, the present invention relates to a power conversion system that includes a master power conversion device and one or more slave power conversion devices. The master power conversion device and the slave power conversion device output PWM voltages to a load in parallel on the basis of gate signals acquired by PWM-modulating the same voltage command value. Each of the master power conversion device and the slave power conversion device includes: a time counter; and a carrier wave generator that generates a carrier wave for PWM-modulating the voltage command value in synchronization with the time counter. The master power conversion device further includes: a synchronization data generating unit that, when the time counter of the master power conversion device reaches a predetermined value, generates synchronization data for synchronizing a value of the time counter of the slave power conversion device with the time counter of the master power conversion device; and a communication unit that transmits the synchronization data to the slave power conversion device. The slave power conversion device further includes: a communication unit that receives the synchronization data from the master power conversion device; a time counter correcting unit that corrects the value of the time counter of the slave power conversion device on the basis of the value of the time counter of the slave power conversion device at the time when the communication unit of the slave power conversion device has completely received the synchronization data and on the basis of a predetermined communication time; a current sensor that detects a current on an output side of the slave power conversion device; and a gate timing adjusting unit that advances or delays a phase of the gate signal of the slave power conversion device on the basis of a circulation current component of the current detected by the current sensor.

Advantageous Effects of Invention

According to the present invention, it is possible to reduce a circulation current with a simple structure and thus to improve a current capacity utilization rate of a power conversion device.

BRIEF DESCRIPTION OF DRAWINGS

FIG. 16 is a timing diagram illustrating an effect resulting from the U-phase gate timing adjusting circuit.

FIG. 17 is a timing diagram illustrating an effect resulting from the U-phase gate timing adjusting circuit.

DESCRIPTION OF EMBODIMENTS

Hereinafter, embodiments of a semiconductor power conversion system and a semiconductor power conversion device according to the present invention are described in detail with reference to the accompanying drawings. The present invention is not limited to these embodiments.

First Embodiment

Figure 1:
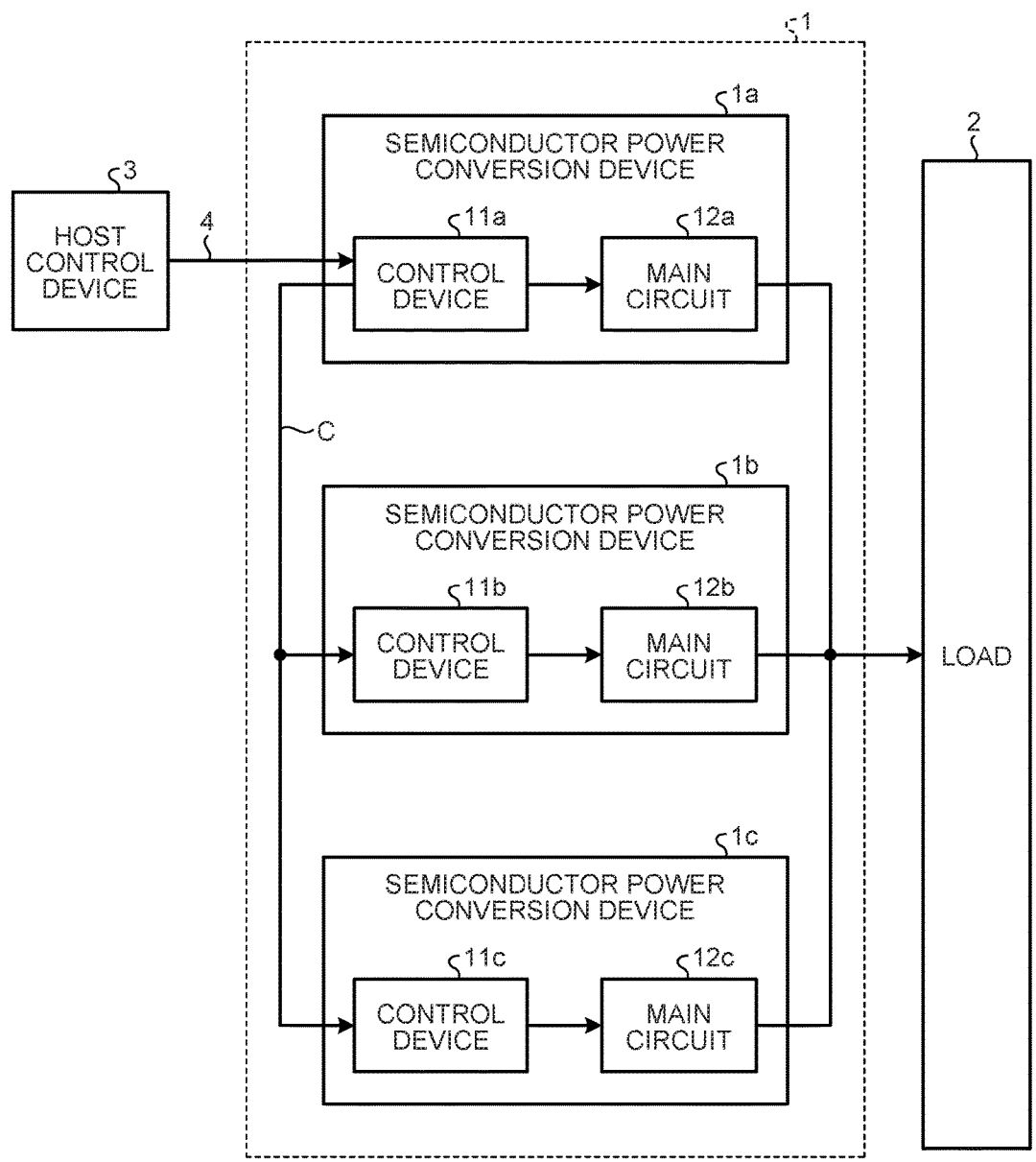
FIG. 1 is a functional block diagram illustrating a configuration of a power conversion system according to a first embodiment of the present invention.

FIG. 1 is a functional block diagram illustrating a configuration of a power conversion system according to a first embodiment of the present invention. As illustrated in FIG. 1, a power conversion system 1 according to the first embodiment includes a plurality of semiconductor power conversion devices 1a, 1b, and 1c. The semiconductor power conversion devices 1a, 1b, and 1c are connected in parallel and to a load 2 such as a motor. Each of the semiconductor power conversion devices 1a, 1b, and 1c generates a PWM voltage for driving the load 2.

In the first embodiment, the semiconductor power conversion system 1 includes three semiconductor power conversion devices 1a, 1b, and 1c, but it is not limited to this number. The semiconductor power conversion system 1 may include two semiconductor power conversion devices or more than three semiconductor power conversion devices.

The semiconductor power conversion device 1a is connected to a host control device 3 via a communication line 4 that can be wired or wireless. A semiconductor power conversion device has been widely used that can communicate with a host control device 3 for performing setting operations or the like based on a communication standard such as RS-485 or universal serial bus (USE). The communication standard of the communication line 4 between the semiconductor power conversion device 1a and the host control device 3 is not specifically limited, but the communication standards of communication unit provided previously as described above are used herein. The host control device 3 transmits a voltage command value, which is a command value for the voltage to be applied to the load 2, to the semiconductor power conversion device 1a via the communication line 4.

The semiconductor power conversion devices 1a, 1b, and 1c are connected to each other via a communication line C that is wired or wireless. The communication standard of the communication line C among the semiconductor power conversion devices 1a, 1b, and 1c is not specifically limited, but the communication standards of the communication unit provided previously as described above are used herein. The semiconductor power conversion device 1a transmits the voltage command value received from the host control device 3 to the semiconductor power conversion devices 1b and 1c via the communication line C.

The host control device 3 may be connected to the semiconductor power conversion devices 1a, 1b, and 1c via the communication line C and the host control device 3 may transmit the voltage command value to the semiconductor power conversion devices 1a, 1b, and 1c via the communication line C.

The semiconductor power conversion device 1a includes a control device 11a and a main circuit 12a; the semiconductor power conversion device 1b includes a control device 11b and a main circuit 12b; and the semiconductor power conversion device 1c includes a control device 11c and a main circuit 12c. The control devices 11a, 11b, and 11c perform a PWM modulation process on the voltage command value supplied from the host control device 3 and output gate signals acquired as the results of the PWM modulation process performed on the voltage command value. The gate signals output from the control devices 11a, 11b, and 11c are input to the main circuits 12a, 12b, and 12c, respectively. The main circuits 12a, 12b, and 12c generate PWM voltages to be supplied to the load 2 on the basis of the input gate signals, respectively.

in the first embodiment, in order to reduce a circulation current, each of the semiconductor power conversion devices 1b and 1c performs first control to control the synchronizing of the phase of a carrier wave of the corresponding semiconductor power conversion device with the phase of a carrier wave of the semiconductor power conversion device 1a by communicating with the semiconductor power conversion device 1a. Each of the semiconductor power conversion devices 1b and 1c performs second control to control the adjusting of the phase of the gate signal of the corresponding semiconductor power conversion device on the basis of the state of the corresponding semiconductor power conversion device. In the first embodiment, the first control is described first and the second control is described second.

Figure 2:
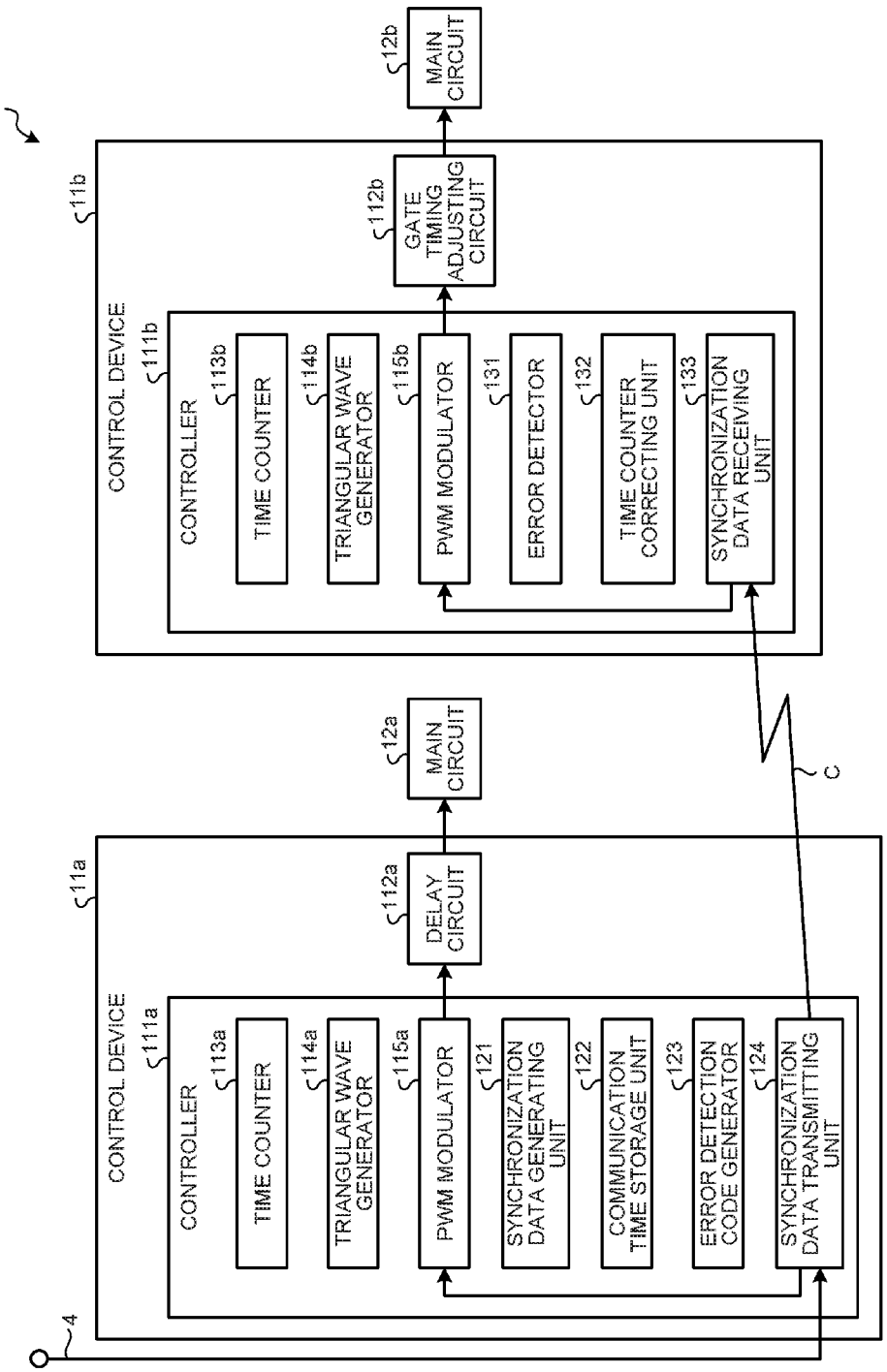
FIG. 2 is a functional block diagram illustrating a functional configuration of a control device of a semiconductor power conversion device.

FIG. 2 is a functional block diagram illustrating a functional configuration of a control device of a semiconductor power conversion device. FIG. 2 illustrates the functional configurations of the control device 11a of the semiconductor power conversion device 1a and the control device 11b of the semiconductor power conversion device 1b. Because the functional configuration of the control device 11c is the same as the functional configuration of the control device 11b, the functional configuration of the control device 11b is described and that of the control device 11c will not be described.

The control device 11a includes a controller 111a and a delay circuit 112a. The controller 111a includes a time counter 113a, which is a cycle counter; a triangular wave generator 114a that generates a triangular wave synchronized with the time counter 113a; and a PWM modulator 115a that, in order to generate a gate signal, PWM-modulates the voltage command value input from the host control device 3 on the basis of the triangular wave generated by the triangular wave generator 114a.

The delay circuit 112a delays the gate signal output from the PWM modulator 115a by a predetermined delay time and outputs the delayed gate signal to the main circuit 12a.

The semiconductor power conversion system 1 can more suitably perform the second control by using the delay circuit 112a provided in the control device 11a. The predetermined delay time of the delay circuit 112a is described in the description of the second control.

The control device 11b includes a controller 111b and a gate timing adjusting circuit 112b. The controller 111b includes a time counter 113b, which is a cycle counter counting in the same cycle as the time counter 113a; a triangular wave generator 114b that generates a triangular wave synchronized with the time counter 113b; and a PWM modulator 115b that, in order to generate a gate signal, PWM-modulates the voltage command value the same as a source voltage value input to the PWM modulator 115a on the basis of the triangular wave generated by the triangular wave generator 114b.

The controller 111b performs the first control. The gate timing adjusting circuit 112b performs the second control.

In the first embodiment, a triangular wave is used as a carrier wave for PWM modulation, but the first control can be similarly performed even when a carrier wave other than a triangular wave, such as a sawtooth wave, is used.

First, the first control will be described below. In describing the first control, for the purpose of easy understanding, it is assumed that both the delay time of the delay circuit 112a and the delay time of the gate timing adjusting circuit 112b are zero.

As described above, the triangular wave generator 114a of the control device 11a and the triangular wave generator 114b of the control device 11b generate triangular waves synchronized with the time counters 113a and 113b, respectively. An example is described below in which the time counters 113a and 113b are not synchronized with each other and the triangular wave generators 114a and 114b generate triangular waves that are not synchronized with each other.

Figure 3:
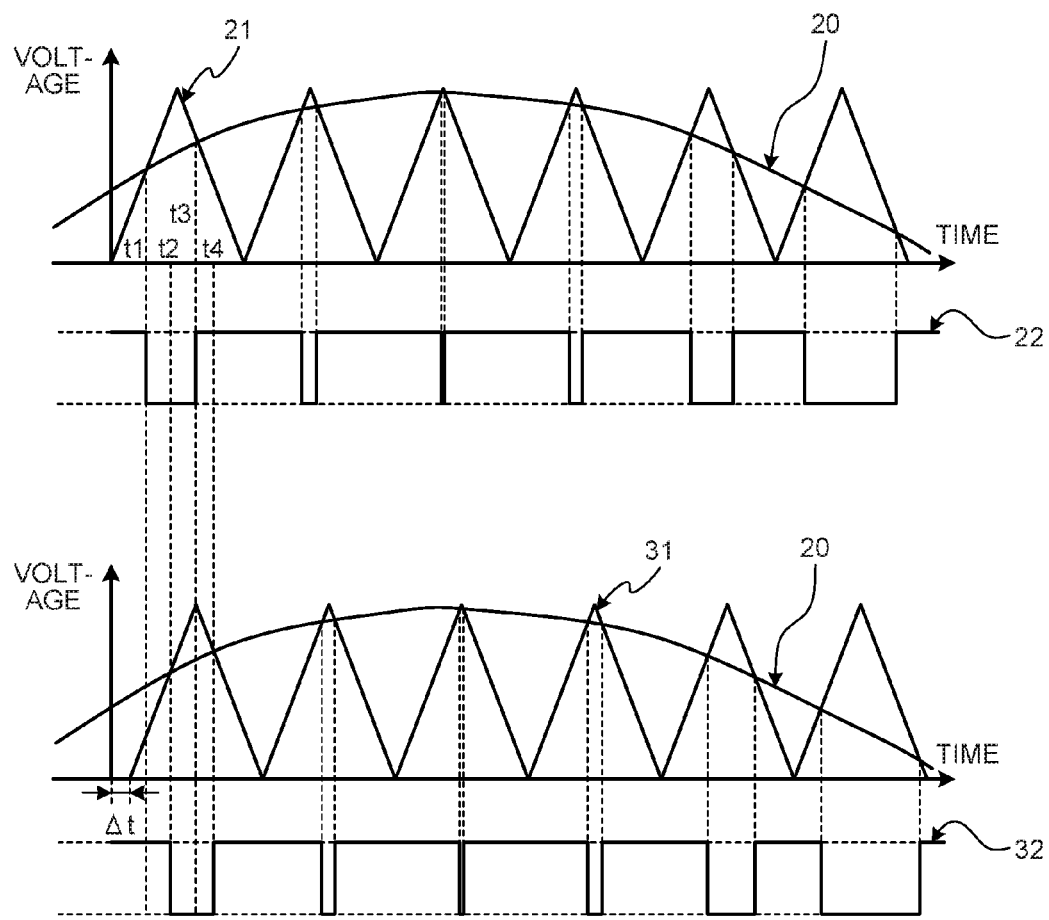
FIG. 3 is a waveform diagram illustrating an example of a voltage command value, a triangular wave, and a gate signal.

FIG. 3 is a waveform diagram illustrating an example of the voltage command value, the triangular wave, and the gate signal. FIG. 3 illustrates the voltage command value 20 input to the controllers 111a and 111b illustrated in FIG. 2, the triangular wave 21 generated by the triangular wave generator 114a, the gate signal 22 generated by the PWM modulator 115a, the triangular wave 31 generated by the triangular wave generator 114b, and the gate signal 32 generated by the PWM modulator 115b.

The same voltage command value 20 is input to the controller 111a and the controller 111b. The triangular wave 31 generated by the triangular wave generator 114b is delayed Δt with respect to the triangular wave 21 generated by the triangular wave generator 114a. That the triangular wave 21 and the triangular wave 31 are not synchronized with each other. The gate signal 32 generated by the PWM modulator 115b is delayed by Δt with respect to the gate signal 22 generated by the PWM modulator 115a. There is a period of time in which the state of the gate signal 22 and the state of the gate signal 32 are different from each other that occurs due to the delay of the gate signal 32.

For example, in one cycle of the left end of the triangular wave 21 and in one cycle of the left end of the triangular wave 31 illustrated in FIG. 3, both the gate signal 22 and the gate signal 32 are at a low level between time t2 and time t3. However, between time t1 and time t2, the gate signal 22 is at a low level and the gate signal 32 is at a high level. Between time t3 and time t4, the gate signal 22 is at a high level and the gate signal 32 is at a low level. That is, between time t1 and time t2 and between time t3 and time t4, the state of the gate signal 22 and the state of the gate signal 32 are different from each other.

The PWM voltage output from the main circuit 12a is generated on the basis of the gate signal 22 and the PWM voltage output from the main circuit 12b is generated on the basis of the gate signal 32. When the state of the gate signal 22 and the state of the gate signal 32 are different from each other, the PWM voltage output from the semiconductor power conversion device 1a and the PWM voltage output from the semiconductor power conversion device 1b are different from each other. Accordingly, because a circulation current flows between the semiconductor power conversion device 1a and the semiconductor power conversion device 1b and thus the current supplied to the load 2 decreases, the current capacity utilization rate of the semiconductor power conversion system 1 decreases. This means it is important to synchronize the gate signals 22 and 32 of the semiconductor power conversion devices 1a, 1b, and 1c.

Therefore, with the first control, the time counter 113b of each of the two different semiconductor power conversion devices 1b and 1c are synchronized with the time counter 113a on the basis of the value of the time counter 113a of the semiconductor power conversion device 1a. The gate signals 22 and 32 are generated by PWM-modulating the voltage command value 20 on the basis of the triangular waves 21 and 31 generated by the time counters 113a and 113b. Accordingly, by synchronizing the time counter 113b and the time counter 113a with each other, it is possible to synchronize the gate signals 22 and 32 of the semiconductor power conversion devices 1a, 1b, and 1c with each other.

Specifically, the semiconductor power conversion device 1a transmits synchronization data to the semiconductor power conversion devices 1b and 1c when the time counter 113a is returned to zero. When the synchronization data is received, the semiconductor power conversion devices 1b and 1c adjusts the value of the time counter 113b on the basis of a result of a comparison of the value of the time counter 113b of each of the semiconductor power conversion devices 1b and 1c when the synchronization data is received with a predetermined communication time required for communication between the semiconductor power conversion device 1a and the semiconductor power conversion devices 1b and 1c.

In order to realize this operation, the controller 111a includes a synchronization data generating unit 121, a communication time storage unit 122, an error detection code generator 123, and a synchronization data transmitting unit 124. The controller 111b includes an error detector 131, a time counter correcting unit 132, and a synchronization data receiving unit 133. In the following description, the semiconductor power conversion device 1a may be referred to as a master semiconductor power conversion device, and the semiconductor power conversion devices 1b and 1c may be referred to as slave semiconductor power conversion devices.

The communication time storage unit 122 stores the communication time between the master semiconductor power conversion device 1a and the slave semiconductor power conversion device 1b, and it also stores the communication time between the master semiconductor power conversion device 1a and the slave semiconductor power conversion device 1c.

The synchronization data generating unit 121 generates two pieces of synchronization data to be transmitted to the slave semiconductor power conversion devices 1b and 1c when the time counter 113a is returned to zero. The synchronization data transmitted to the slave semiconductor power conversion device 1b describes the communication time between the master semiconductor power conversion device 1a and the slave semiconductor power conversion device 1b, which is stored in the communication time storage unit 122. The synchronization data transmitted to the slave semiconductor power conversion device 1c describes the communication time between the master semiconductor power conversion device 1a and the slave semiconductor power conversion device 1c, which is stored in the communication time storage unit 122.

The error detection code generator 123 generates two error detection codes for two pieces of synchronization data generated by the synchronization data generating unit 121 and it adds the two generated error detection codes to the two pieces of synchronization data, respectively. The types of the error detection codes are not particularly limited, and may be, for example, a checksum type or a cyclic redundancy check (CRC) type. The synchronization data transmitting unit 124 is a communication interface for transmitting the two pieces of synchronization data, to which the error detection codes are added, to the slave semiconductor power conversion devices 1b and 1c via the communication line C. The synchronization data transmitting unit 124 also functions as a receiver of the voltage command value supplied from the host control device 3, as a transmitter of the received voltage command value to the PWM modulator 115a, and as a transmitter of the received voltage command value to the slave semiconductor power conversion devices 1b and 1c.

The synchronization data receiving unit 133 is a communication interface for receiving the synchronization data transmitted from the master semiconductor power conversion device 1a. The synchronization data receiving unit 133 also functions as a receiver of the voltage command value from the master semiconductor power conversion device 1a and as a transmitter of the received voltage command value to the PWM modulator 115b. The error detector 131 detects an error in the synchronization data on the basis of the error detection code added to the received synchronization data.

The time counter correcting unit 132 reads the communication time from the synchronization data that is determined not to have an error by the error detector 131. The time counter correcting unit 132 compares the communication time with the value of the time counter 113b when the synchronization data has been completely received, and it performs a time counter correcting process, which is a process of correcting the value of the time counter 113b in a time advancing direction or a time delaying direction on the basis of the result of the comparison.

In the above description, the time required for communication between the master semiconductor power conversion device 1a and the slave semiconductor power conversion devices 1b and 1c is referred to as the communication time. However, the time counter correcting unit 132 compares the communication time with the value of the time counter 113b when the synchronization data is completely received. Thus, the communication time strictly refers to a time from a time point at which the time counter 113a is returned to zero to a time point at which the slave semiconductor power conversion devices 1b and 1c have completely received the synchronization data.

By changing the definition of the above-mentioned communication time, the time at which the time counter correcting unit 132 reads the value of the time counter 113b can be changed. For example, by changing the definition of an end of the communication time to t seconds after the synchronization data is completely received, the time counter correcting unit 132 does not need to read the time counter 113b immediately after the synchronization data is completely received, and it may read the time counter 113b at t seconds after the synchronization data is completely received.

Figure 4:
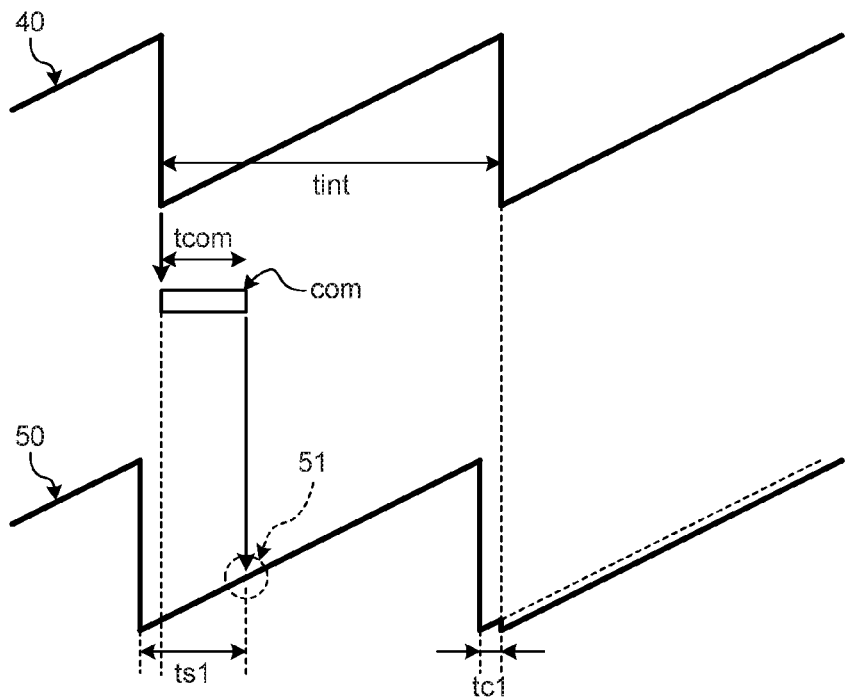
FIG. 4 is a timing diagram illustrating a time counter correcting process.
Figure 5:
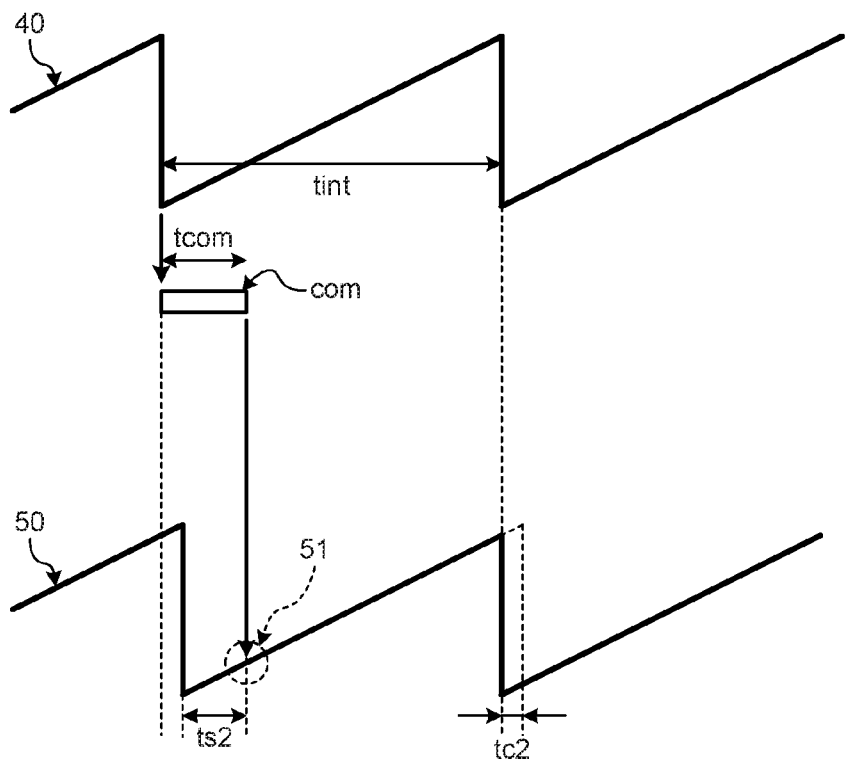
FIG. 5 is a timing diagram illustrating the time counter correcting process.

FIGS. 4 and 5 are timing diagrams illustrating the time counter correcting process. FIG. 4 is a diagram illustrating a case in which the time counter of the slave semiconductor power conversion device is advanced with respect to the time counter of the master semiconductor power conversion device. FIG. 5 is a diagram illustrating a case in which the time counter of the slave semiconductor power conversion device is delayed with respect to the time counter of the master semiconductor power conversion device.

As illustrated in FIG. 4, the value 40 of the time counter 113a and the value 50 of the time counter 113b repeat the return-to-zero process with the same cycle tint. When the value 40 of the time counter 113a is returned to zero, a communication process com is performed between the master semiconductor power conversion device 1a and the slave semiconductor power conversion device 1b, and the synchronization data is transmitted from the master semiconductor power conversion device 1a to the slave semiconductor power conversion device 1b. The slave semiconductor power conversion device 1b completely receives the synchronization data at a time 51, which is a communication time tcom that passes after the time counter 113a is returned to zero.

When the time counter 113a of the master semiconductor power conversion device 1a and the time counter 113b of the slave semiconductor power conversion device 1b are synchronized with each other, the value of the time counter 113b at the time 51 at which the slave semiconductor power conversion device 1b completely receives the synchronization data is a value which is equal to tcom.

in contrast, when the time counter 113b of the slave semiconductor power conversion device 1b is advanced with respect to the time counter 113a of the master semiconductor power conversion device 1a as illustrated in FIG. 4, the value of the time counter 113b at the time 51 at which the slave semiconductor power conversion device 1b completely receives the synchronization data is a value ts1, which is greater than tcom. Accordingly, the time counter correcting unit 132 returns the time counter 113b to zero again when tc1, which is the difference between ts1 and tcom, passes after the time counter 113b is returned to zero the next time.

Accordingly, the time counter 113b of the slave semiconductor power conversion device 1b is returned by the time period that has been advanced so that it is synchronized with the time counter 113a of the master semiconductor power conversion device 1a.

When the time counter 113b of the slave semiconductor power conversion device 1b is delayed with respect to the time counter 113a of the master semiconductor power conversion device 1a as illustrated in FIG. 5, the value of the time counter 113b at the time 51, which is the time when the slave semiconductor power conversion device 1b completely receives the synchronization data, is a value ts2, which is smaller than tcom. Accordingly, the time counter correcting unit 132 returns the time counter 113b to zero earlier by tc2, which is the difference between ts2 and tcom, than the estimated time at which the time counter 113b is returned to zero the next time Accordingly, the time counter 113b of the slave semiconductor power conversion device 1b is advanced by the delayed time and it is synchronized with the time counter 113a of the master semiconductor power conversion device 1a.

When the synchronization data is received, in a manner similar to the slave semiconductor power conversion device 1b, the slave semiconductor power conversion device 1c corrects the value of the time counter of the slave semiconductor power conversion device 1c on the basis of the result of a comparison of the communication time between the master semiconductor power conversion device 1a and the slave semiconductor power conversion device 1c with the value of the time counter of the slave semiconductor power conversion device 1c at the time point at which the synchronization data is received.

Figure 6:
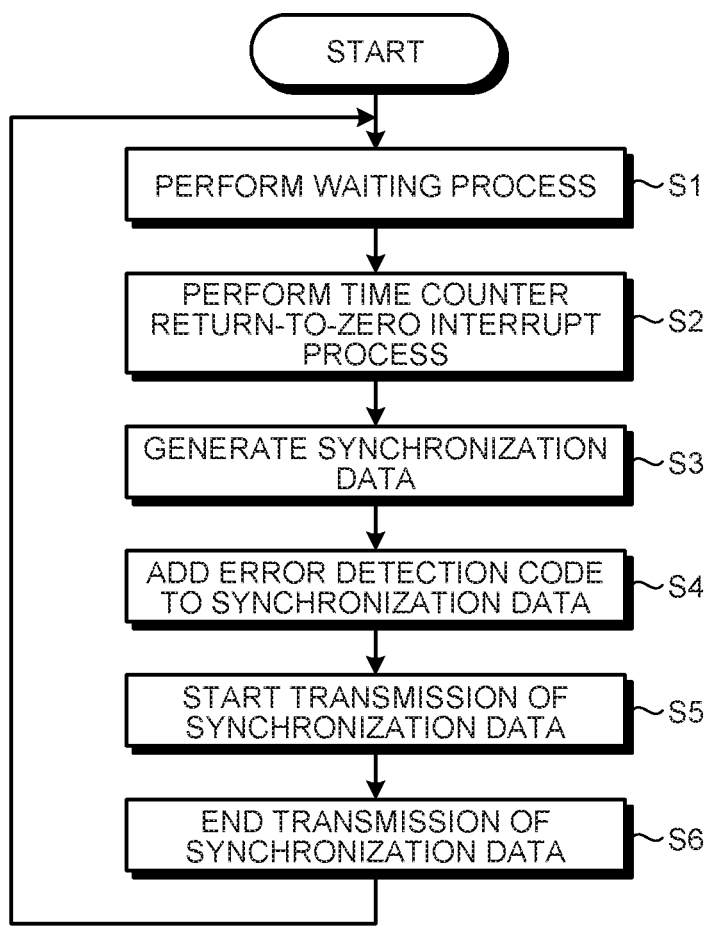
FIG. 6 is a flowchart illustrating an operation of a master semiconductor power conversion device.
Figure 7:
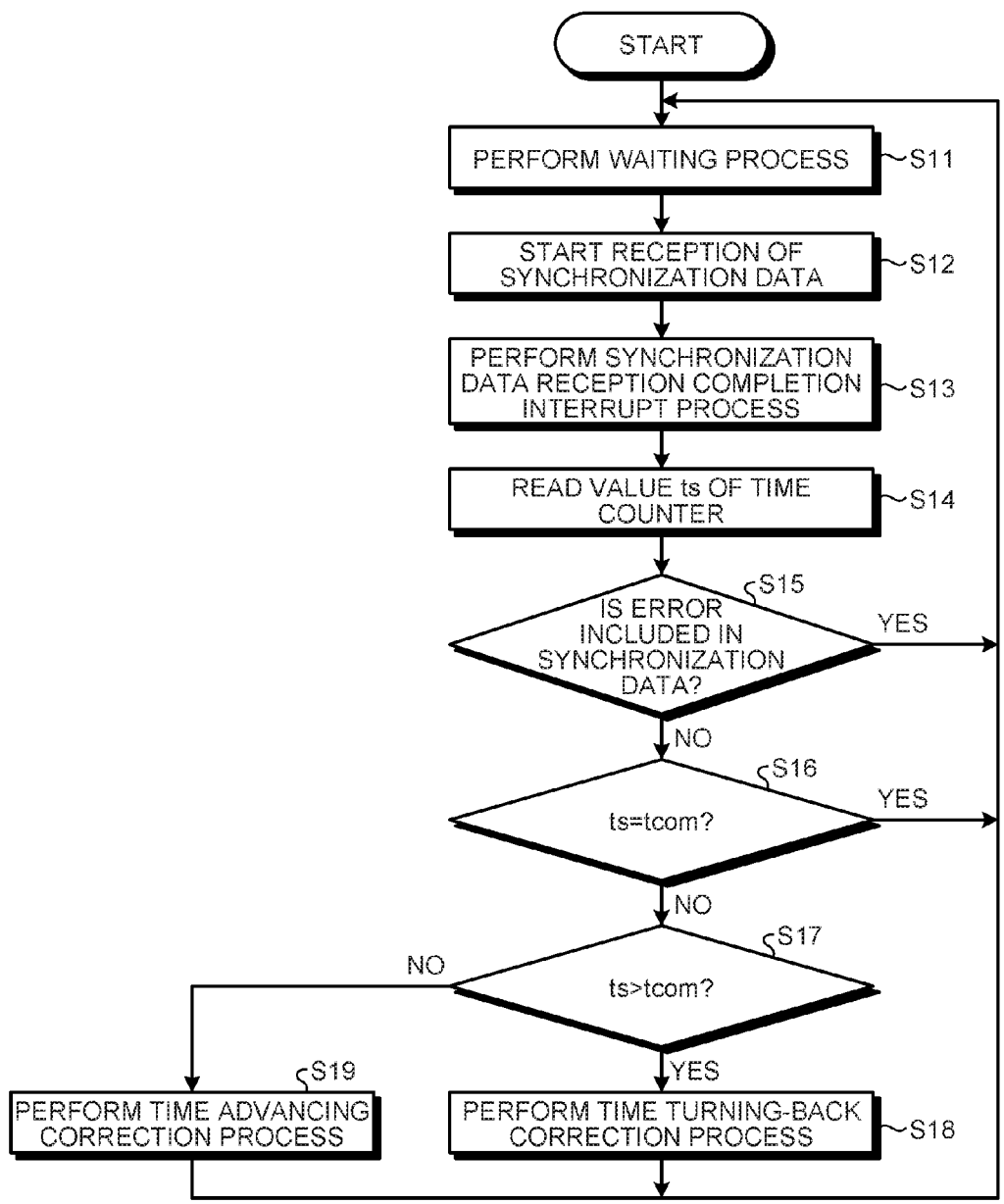
FIG. 7 is a flowchart illustrating an operation of a slave semiconductor power conversion device.

The synchronizing operation of the semiconductor. power conversion system according to the first embodiment is described below with reference to FIGS. 6 and 7. FIG. 6 is a flowchart illustrating the operation of the master semiconductor power conversion device. FIG. 7 is a flowchart illustrating the operation of the slave semiconductor power conversion device.

Referring to FIG. 6, first, the master semiconductor power conversion device 1a performs a waiting process of waiting for a start operation of synchronizing the slave semiconductor power conversion device 1b with the master semiconductor power conversion device 1a at step S1. When the time counter 113a is returned to zero and a time counter return-to-zero interrupt occurs, the master semiconductor power conversion device 1a starts a time counter return-to-zero interrupt process which is an interrupt process for transmitting the synchronization data at step S2. Subsequently, the synchronization data generating unit 121 reads the communication time with the slave semiconductor power conversion device 1b and the communication time with the slave semiconductor power conversion device 1c from the communication time storage unit 122, and it generates two pieces of synchronization data including the read two communication times at step S3, Then, the error detection code generator 123 generates two error detection codes for the two pieces of synchronization data and adds the generated two error detection codes to the two pieces of synchronization data, respectively, at step S4. Then, the synchronization data transmitting unit 124 starts transmission of the two pieces of synchronization data having the error detection codes added thereto to the slave semiconductor power conversion devices 1b and 1c at S5. At step S6, the synchronization data transmitting unit 124 ends the transmission of the synchronization data. Then, the master semiconductor power conversion, device 1a waits at step S1 until a next time counter return-to-zero interrupt occurs.

Referring to FIG. 7, first, the slave semiconductor power conversion device 1b performs a waiting process of waiting for the start operation of synchronizing the slave semiconductor power conversion device 1b with the master semiconductor power conversion device la at step S11. The synchronization data receiving unit 133 starts reception of synchronization data at step S12. When the reception of synchronization data is completed and a synchronization data reception completion interrupt occurs, the synchronization data receiving unit 133 performs a synchronization data reception completion interrupt process at step S13. Subsequently, the time counter correcting unit 132 reads the value ts of the time counter 113b of the slave semiconductor power conversion device 1b, that is, a slave time counter 113b at step S14.

Subsequently, the error detector 131 determines whether an error is present in the received synchronization data on the basis of the error detection code added to the received synchronization data at step S15. When it is determined at step S15 that an error is determined present, that is, when the determination result of step S15 is Yes, the slave semiconductor power conversion device 1b waits until next synchronization data is received at step S11.

When it is determined at step S15 that an error is not present, that is, when the determination result of step S15 is No, the time counter correcting unit 132 determines whether the value ts of the time counter 113b is equal to the communication time tcom described in the synchronization data, that is, whether ts=tcom is satisfied, at step S16.

When it is determined at step S16 that the value ts of the time counter 113b is equal to the communication time tcom, that is, when the determination result of step S16 is Yes, the time counter 113a and the time counter 113b are synchronized with each other, that is, the master semiconductor power conversion device 1a and the slave semiconductor power conversion device 1b are synchronized with each other. Accordingly, the slave semiconductor power conversion device 1b waits until next synchronization data is received at step S11.

On the other hand, when it is determined at step S16 that the value ts of the time counter 113b is not equal to the communication time tcom, that is, when the determination result of step S16 is No, the time counter 113a and the time counter 113b are not synchronized with each other, that is, the master semiconductor power conversion device 1a and the slave semiconductor power conversion device 1b are not synchronized with each other. Accordingly, the time counter correcting unit 132 further determines whether the value ts of the time counter 113b is greater than the communication time tcom, that is, whether ts>tcom is satisfied, at step S17.

When it is determined at step S17 that the value ts of the time counter 113b is greater than the communication time tcom, that is, when the determination result of step S17 is Yes, the time counter 113b is advanced with respect to the time counter 113a. Accordingly, the time counter correcting unit 132 performs a time delaying direction correction process which is a correction process in a time delaying direction on the time counter 113b at step S18.

On the other hand, when it is determined at step S17 that the value ts of the time counter 113b is smaller than the communication time tcom, that is, when the determination result of step S17 is No, the time counter 1113b is delayed with respect to the time counter 113a. Accordingly, the time counter correcting unit 132 performs a time advancing direction correction process which is a correction process in a time advancing direction on the time counter 113b at step S19.

After the process of step S18 or S19 is performed, the slave semiconductor power conversion device 1b waits until next synchronization data is received at step S11.

In the above description, the communication time storage unit 122 which is the master semiconductor power conversion device 1a stores the communication time. However, the communication time storage unit 122 may be deleted and each of the slave semiconductor power conversion devices 1b and 1c may be provided with a communication time storage unit that stores the communication time required for communication between the master semiconductor power conversion device 1a and the corresponding slave semiconductor power conversion devices 1b and 1c. That is, the master semiconductor power conversion device 1a transmits synchronization data that does not include the communication time to the slave semiconductor power conversion devices 1b and 1c; and the slave semiconductor power conversion devices 1b and 1c can compare the value of the time counter 113b of the corresponding slave semiconductor power conversion devices 1b and 1c with the stored communication time. When a case in which the communication time varies is considered such as a case in which the size of the synchronization data is variable, the synchronization data generating unit 121 may calculate the communication time to be described in the synchronization data on the basis of the size of the synchronization data, the process time required before or after transmission and reception of the synchronization data, or the like.

The communication time described in the synchronization data may not have the same unit as the count values of the time counters 113a and 113b. When the unit of the communication time is different from the unit of the count value, the time counter correcting unit 132 can convert the communication time such that the unit of the communication time read from the received synchronization data is the same as the unit of the count value, and it can correct the time counter 113b on the basis of the converted communication time.

It has been described above that the time counters 113a and 113b are cycle counters and the synchronization data is generated when the time counter 113a is returned to zero. However, the time at which the synchronization data is generated may not be the time at which the time counter 113a is returned to zero. For example, the synchronization data generating unit 121 may generate the synchronization data when the time counter 113a reaches a predetermined value; and the time counter correcting unit 132 may correct the time counter 113b on the basis of a difference between the communication time and a value obtained by subtracting a predetermined value from the value of the time counter 113b at the time point the synchronization data receiving unit 133 completely receives the synchronization data. The time counters 113a and 113b may not be cycle counters, but it may be counters that count up or count down for a long time. The time counters 113a and 113b are preferably made as hardware from the viewpoint of excellent counting accuracy, but they may also be embodied by software.

It has been described above that the synchronization data transmitting unit 124 and the synchronization data receiving unit 133 receive the voltage command value supplied from the host control device 3, and they transmit the received voltage command value to the PWM modulator 115a and the PWM modulator 115b, respectively. However, the controllers 111a and 111b may be configured to separately have a communication function unit for transmitting and receiving a voltage command value and communication function unit for transmitting and receiving synchronization data.

As described above, according to the first control, the master semiconductor power conversion device 1a generates two pieces of synchronization data having an error detection code added thereto and transmits the two pieces of synchronization data to the slave semiconductor power conversion devices 1b and 1c, respectively, when the time counter 113a of the master semiconductor power conversion device 1a reaches a predetermined value. Then, the slave semiconductor power conversion devices 1b and 1c detect an error of the received synchronization data on the basis of the error detection code added to the received synchronization data. Here, when an error is not detected from the received synchronization data, the slave semiconductor power conversion devices 1b and 1c correct the values of the time counters 113b of the corresponding slave semiconductor power conversion devices 1b and 1c on the basis of the value of the time counters 113b of the corresponding slave semiconductor power conversion devices 1b and 1c at the time the synchronization data is completely received and the communication time of the synchronization data calculated in advance. Accordingly, by performing the synchronization process at the time the time counter 113a reaches the predetermined value, the synchronization accuracy is not affected even when the semiconductor power conversion system 1 uses the communication line C having a low data transmission speed. That is, the semiconductor power conversion system 1 can use a communication line C having a low speed and a low cost. The semiconductor power conversion system 1 does not perform the synchronization process when a data transmission error occurs due to noise or the like, and thus the synchronization is made at wrong timings due to the influence of noise and a required noise countermeasure level can be lowered. That is, in the semiconductor power conversion system 1, a plurality of semiconductor power conversion devices can operate in synchronization with each other with a simple configuration without being affected by noise.

According to the above-mentioned first control, the time counters 113a and 113b of the semiconductor power conversion devices 1a, 1b, and 1c can be synchronized with each other. However, a factor to damage switching timing synchronization of the switching elements may be present in circuits in a stage subsequent to the time counters 113a and 113b. For example, the switching elements in the main circuits 12a, 12b, and 12c or circuits for driving the switching elements may have individual differences or may have characteristic variations caused due to an ambient environment such as a temperature. When the individual differences or the characteristic variations occur, the switching timing synchronization of the switching elements is damaged so as to generate a circulation current due to the influence of the individual differences or the characteristic variations.

Accordingly, in the second control, the slave semiconductor power conversion devices 1b and 1c adjust the timings of the gate signals supplied to the main circuits 12b and 12c on the basis of the states of the corresponding semiconductor power conversion devices 1b and 1c. Each of the semiconductor power conversion devices 1b and 1c repeatedly performs the second control to be described later with a predetermined cycle.

Figure 8:
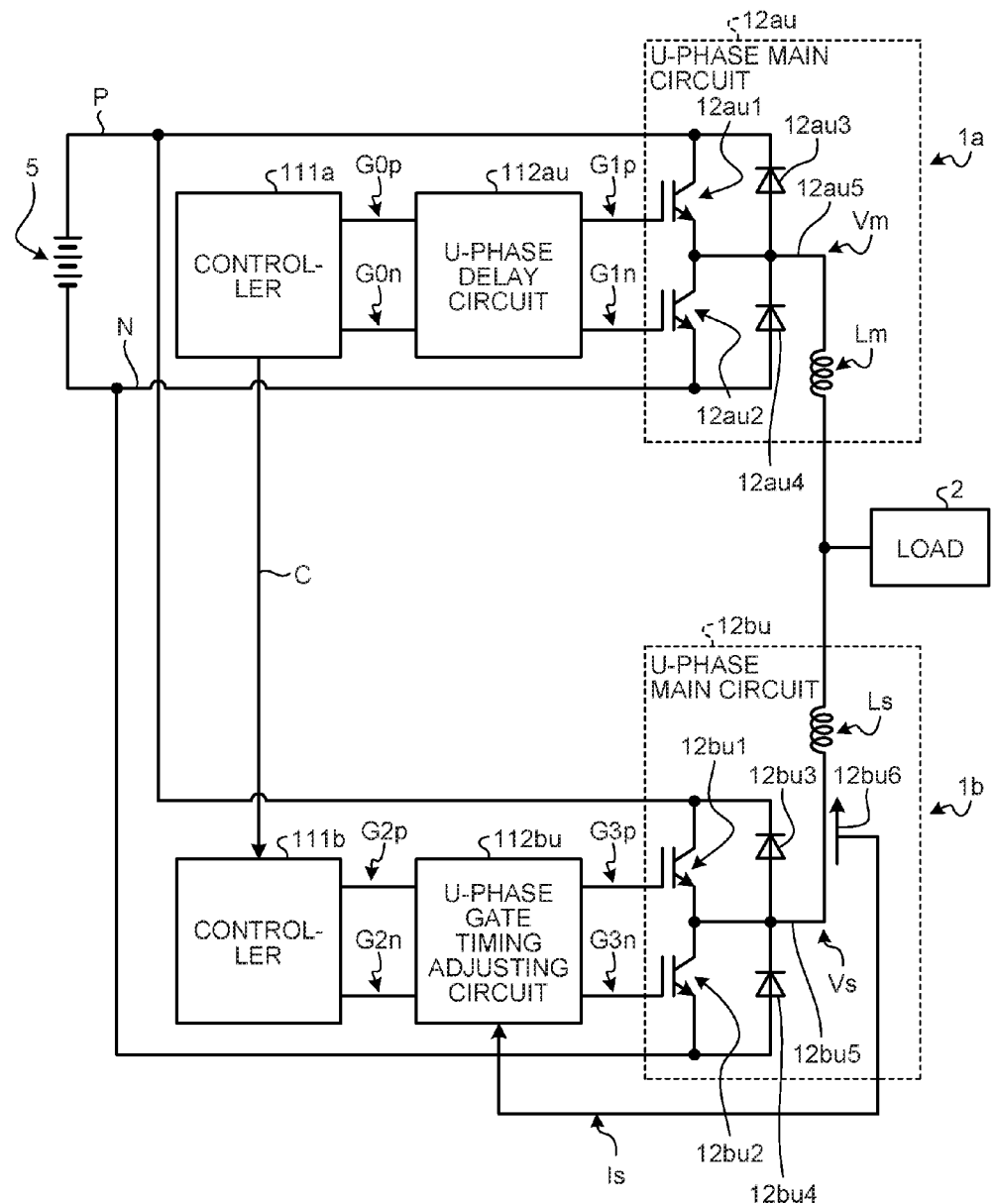
FIG. 8 is a functional block diagram illustrating configurations of a delay circuit, a gate timing adjusting circuit, and a main circuit.

FIG. 8 is a functional block diagram illustrating configurations of the delay circuit, the gate timing adjusting circuit, and the main circuit. In FIG. 8, illustrated are the U-phase components of the delay circuit 112a, the main circuit 12a, the gate timing adjusting circuit 112b, and the main circuit 12b.

When the semiconductor power conversion system 1 is a single-phase output system, the delay circuit 112a, the main circuit 12a, the gate timing adjusting circuit 112b, and the main circuit 12b further include V-phase circuits. But the circuit configuration of the V-phase circuits is the same as the circuit configuration of the U-phase circuits. When the semiconductor power conversion system 1 is a three-phase output system, the delay circuit 112a, the main circuit 12a, the gate timing adjusting circuit 112b, and the main circuit 12b further include V-phase circuits and W-phase circuits. But the circuit configurations of the V-phase circuits and the W-phase circuits are the same as the circuit configuration of the U-phase circuits.

The U-phase main circuit 12au of the master semiconductor power conversion device 1a illustrated in FIG. 1 includes two switching elements 12au1 and 12au2 that are connected in series between a high-potential DC power bus P and a low-potential DC power bus N. DC power is supplied to between the high-potential DC power bus P and the low-potential DC power bus N from a DC power source 5, A diode 12au3 for freewheel is connected in anti-parallel to the switching element 12au1. A diode 12au4 for freewheel is connected in anti-parallel to the switching element 12au2.

A connection point of the switching element 12au1 and the switching element 12au2 is connected to the load 2 via an output line 12au5. The output line 12au5 has an inductance component Lm. The inductance component Lm is a component of the output line 12au5, but is not a circuit element.

The U-phase delay circuit 112au is supplied with a high-potential gate signal G0p and a low-potential gate signal G0n from the controller 111a. The U-phase delay circuit 112au supplies the gate terminal of the switching element 12au1 and the gate terminal of the switching element 12au2 with a high-potential gate signal G1p and a low-potential gate signal G1n obtained by delaying the gate signals G0p and G0n by a predetermined delay time, respectively.

The U-phase main circuit 12bu of the slave semiconductor power conversion device 1b illustrated in FIG. 1 is provided with two switching elements 12bu1 and 12bu2 connected in series between a high-potential DC power bus P and a low-potential DC power bus N.

A diode 12bu3 for freewheel is connected in anti-parallel to the switching element 12bu1. A diode l2bu4 for freewheel is connected in anti-parallel to the switching element 12bu2.

A connection point of the switching element l2bu1 and the switching element 12bu2 is connected to the load 2 via an output line 12bu5. The output line 12bu5 has an inductance component Ls. The inductance component Ls is a component of the output line 12bu5, but is not a circuit element.

The output line 12bu5 is provided with a current sensor 12bu6 that detects a current Is flowing in the output line 12bu5. The direction of the current Is detected by the current sensor 12bu6 is a direction from the U-phase main circuit 12bu to the load 2 and the U-phase main circuit 12au.

The U-phase gate timing adjusting circuit 112bu is supplied with a high-potential gate signal G2p and a low-potential gate signal G2n from the controller 111b. The U-phase gate timing adjusting circuit 112bu supplies the gate terminal of the switching element 12bu1 and the gate terminal of the switching element 12bu2 with a high-potential gate signal G3p and a low-potential gate signal G3n, which are obtained by adjusting the times of the gate signals G2p and G2n in the time advancing direction or the time delaying direction, on the basis of the current Is detected by the current sensor 12bu6.

Figure 9:
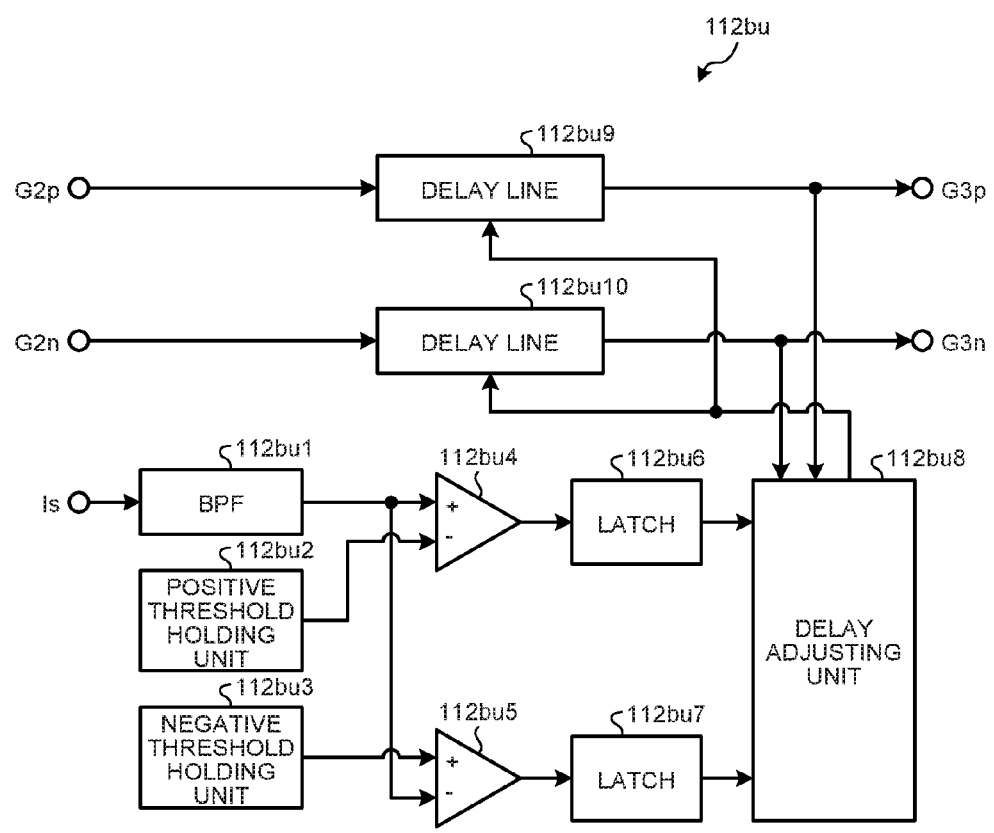
FIG. 9 is a functional block diagram illustrating a configuration of a U-phase gate timing adjusting circuit.

FIG. 9 is a functional block diagram illustrating a configuration of the U-phase gate timing adjusting circuit. As illustrated in FIG. 9, the U-phase gate timing adjusting circuit 112bu includes a bandpass filter 112bu1, a positive threshold holding unit 112bu2, a negative threshold holding unit 112bu3, comparators 112bu4 and 112bu5, latches 112bu6 and 112bu7, a delay adjusting unit 112bu8, and delay lines 112bu9 and 112bu10.

The bandpass filter 112bu1 removes a noise component and a load current component, which is from the U-phase main circuit 12bu to the load 2, from the current. Is; passes a circulation current component; and supplies the resultant current to a non-inverted input, terminal of the comparator 112bu4 and an inverted input terminal of the comparator 112bu5.

Figure 10:
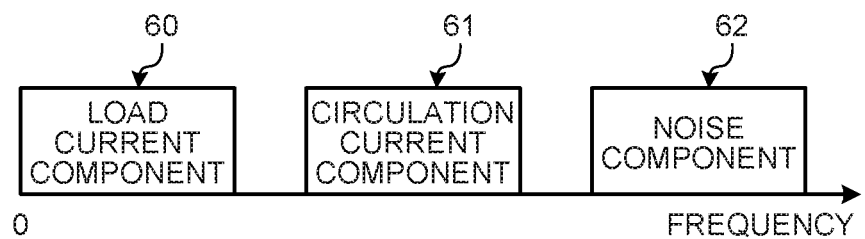
FIG. 10 is a diagram illustrating an example of a frequency spectrum of a current of a U-phase main circuit.

FIG. 10 is a diagram illustrating an example of a frequency spectrum of the current of the U-phase main circuit. As illustrated in FIG. 10, the current Is of the U-phase main circuit 12bu has a load current component 60 in a low frequency region; a circulation current component 61 in a middle frequency region; and a noise component 62 in a high frequency region. The frequency of the load current component 60 ranges from 0 Hz to about 1 kHz. The frequency of the noise component 62 is higher than several hundreds of kHz.

When the switching timing of the master semiconductor power conversion device 1a and the switching timing of the slave semiconductor power conversion device 1b are matched with each other, a current variation of the current Is is a normal variation of the current flowing to the load 2. The value of the current variation, when the switching timing of the master semiconductor power conversion device 1a and the switching timing of the slave semiconductor power conversion device 1b are matched with each other, is determined depending on the voltage between the DC power bus P and the DC power bus N and the inductance of the load 2. The current variation, when the switching timing of the master semiconductor power conversion device 1a and the switching timing of the slave semiconductor power conversion device 1b are matched with each other, is slower and lower in frequency than the vibration of the circulation current when the switching timing of the master semiconductor power conversion device 1a and the switching timing of the slave semiconductor power conversion device 1b are not matched with each other.

Accordingly, the bandpass filter 112bu1 removes the load current component 60 and the noise component 62 and passes the circulation current component 61. As a result, the bandpass filter 112bu1 can supplied only the circulation current component 61 to the comparators 112bu4 and 112bu5, thereby enhancing the gate timing adjustment accuracy.

Figure 11:
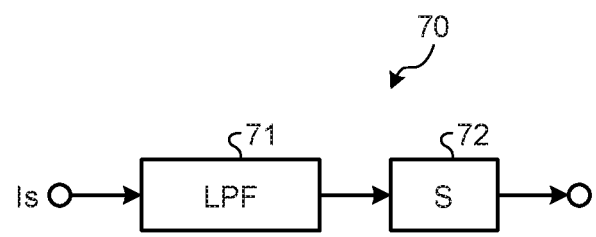
FIG. 11 is a functional block diagram illustrating an example of another filter circuit.

The U-phase gate timing adjusting circuit 112bu may include another circuit instead of the bandpass filter 112bu1. FIG. 11 is a functional block diagram illustrating an example of another filter circuit. A filter circuit 70 illustrated in FIG. 11 includes a low-pass filter 71 that removes a high-frequency component and a differentiation element 72 that removes a low-frequency component by differentiating the output of the low-pass filter 71 of the current Is.

Referring to FIG. 9 again, the positive threshold holding unit 112bu2 supplies the inverted input terminal of the comparator 112bu4 with a positive threshold value which is allowed in the circulation current component of the current Is. The negative threshold holding unit 112bu3 supplies the non-inverted input terminal of the comparator 112bu5 with a negative threshold value which is allowed in the circulation current component of the current Is.

The comparator 112bu4 compares the positive threshold value supplied to the inverted input terminal with the amplitude of the circulation current component of the current Is supplied to the non-inverted input terminal. The comparator 112bu4 supplies a high-level signal to the latch 112bu6 when the amplitude of the circulation current component of the current Is is greater than the positive threshold value, and supplies a low-level signal to the latch 112bu6 when the amplitude of the circulation current component of the current Is is not greater than the positive threshold value.

The comparator 112bu5 compares the negative threshold value supplied to the non-inverted input terminal with the amplitude of the circulation current component of the current Is supplied to the inverted input terminal. The comparator 112bu5 supplies a high-level signal to the latch 112bu7 when the negative threshold value is greater than the amplitude of the circulation current component of the current Is, and it supplies a low-level signal to the latch 112bu7 when the negative threshold value is not greater than the amplitude of the circulation current component of the current Is.

The latch 112bu6 operates in synchronization with a clock signal and holds the output signal of the comparator 112bu4 for a predetermined time. The latch 112bu7 operates in synchronization with a clock signal and holds the output signal of the comparator 112bu5 for a predetermined time.

The delay adjusting unit 112bu8 controls the delay times of the delay lines 112bu9 and 112bu10 on the basis of the signals supplied from the latches 112bu6 and 112bu7.

Here, when the possible delay times of the delay lines 112bu9 and 112bu10 range from 0 to T, the delay adjusting unit 112bu8 controls the delay times of the delay lines 112bu9 and 112bu10 so as to be a half of T in the initial stage. The delay times of the delay lines 112bu9 and 112bu10 in the initial stage are not limited to the half of T, but may be set to another value in the range of 0 to T.

Figures 12, 13:
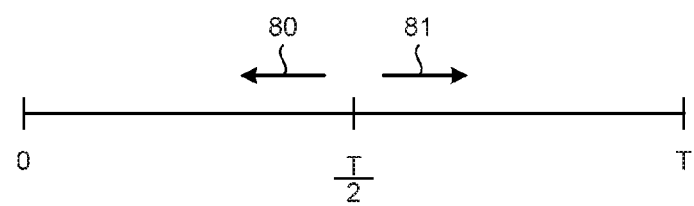
FIG. 12 is a diagram illustrating a delay time of a delay line.
FIG. 13 is a diagram illustrating an adjustment direction of a delay adjusting unit.

FIG. 12 is a diagram illustrating a delay time of a delay line. By setting the delay times of the delay lines 112bu9 and 112bu10 to a half of T in the initial stage, the delay adjusting unit 112bu8 may adjust the delay times of the delay lines 112bu9 and 112bu10 with an adjustment width of a half of T in a time advancing direction 80, and may also adjust the delay times of the delay lines 112bu9 and 112bu10 with an adjustment width of a half of T in a time delaying direction 81.

The predetermined delay time of the U-phase delay circuit 112au of FIG. 8 can be determined to be the same time as the delay time of the delay lines 112bu9 and 112bu10 in the initial stage. Accordingly, the phases of the gate signals G1p and G1n in the initial stage can be matched with the phases of the gate signals G3p and G3n.

FIG. 13 is a diagram, illustrating an adjustment direction of the delay adjusting unit. As illustrated in the first row of the table 80 in FIG. 13, in a state in which the increasing direction of the circulation current component of the current Is is a positive direction and the amplitude of the circulation current component of the current Is is greater than the positive threshold value when the gate signal G3p is changed from a low level to a high level, the output voltage Vs of the U-phase main circuit 12bu is earlier changed to a high level than the output voltage Vm of the U-phase main circuit 12au is changed to a high level. Accordingly, the delay adjusting unit 112bu8 controls the delay lines 112bu9 and 112bu10 in the direction in which the phases of the gate signals G3p and G3n are delayed. That is, delay adjusting unit 112bu8 controls the delay lines 112bu9 and 112bu10 so as to increase the delay times of the delay lines 112bu9 and 112bu10.

Accordingly, the delay adjusting unit 112bu8 can approximate the time at which the output voltage Vs of the U-phase main circuit 12bu is changed to a high level to the time at which the output voltage Vm of the U-phase main circuit 12au is changed to a high level. As a result, the delay adjusting unit 112bu8 can decrease the circulation. current component of the current Is.

As described above, the U-phase gate timing adjusting circuit 112bu repeatedly performs the gate timing adjusting operation with a predetermined cycle. Accordingly, the U-phase gate timing adjusting circuit 112bu can slowly decrease the circulation current component of the current Is.

It can be considered that the width by which the delay adjusting unit 112bu8 increases or decreases the delay time of the delay lines 112bu9 and 112bu10 is set to a predetermined constant time. It can also be considered that the width increases as the amplitude of the circulation current component of the current Is increases. In the technique of increasing the predetermined constant time, the circulation current can be steadily set a convergence direction. Accordingly, it is considered that this technique is effective when the number of semiconductor power conversion devices is large, for example, when the number of semiconductor power conversion devices is two or greater. On the other hand, in the technique of increasing an increasing width as the amplitude of the circulation current component of the current Is increases, the convergence time of the circulation current can be shortened but there is a possibility that the circulation current will diverge. Accordingly, it is possible to shorten the convergence time of the circulation current and to reduce the possibility that the circulation current will diverge when the number of semiconductor power conversion devices is small, for example, when the number of semiconductor power conversion devices is two, which is advantageous.

As illustrated in the second row of the table 80 in FIG. 13, in a state in which the increasing direction of the circulation current component of the current Is is a negative direction and the amplitude of the circulation current component of the current Is is greater than the negative threshold value when the gate signal G3*p* is changed from a low level to a high level, the output voltage Vs of the U-phase main circuit 12*bu* is later changed to a high level than the output voltage Vm of the U-phase main circuit 12*au* is changed to a high level. Accordingly, the delay adjusting unit 112*bu*8 controls the delay lines 112*bu*9 and 112*bu*10 in the direction in which the phases of the gate signals G3*p* and G3*n* are advanced. That is, the delay adjusting unit 112*bu*8 controls the delay lines 112*bu*9 and 112*bu*10 so as to decrease the delay times of the delay lines 112*bu*9 and 112*bu*10.

Accordingly, the delay adjusting unit 112*bu*8 can approximate the time at which the output voltage Vs of the U-phase main circuit 12*bu* is changed to a high level to the time at which the output voltage Vm of the U-phase main circuit 12*au* is changed to a high level. As a result, the delay adjusting unit 112*bu*8 can decrease the circulation current component of the current Is.

As illustrated in the third row of the table 80 in FIG. 13, in a state in which the increasing direction of the circulation current component of the current Is is a positive direction and the amplitude of the circulation current component of the current Is is greater than the positive threshold value when the gate signal G3*p* is changed from a high level to a low level, the output voltage Vs of the U-phase main circuit 12*bu* later changed to a low level than the output voltage Vm of the U-phase main circuit 12*au* is changed to a low level. Accordingly, the delay adjusting unit 112*bu*8 controls the delay lines 112*bu*9 and 112*bu*10 in the direction in which the phases of the gate signals G3*p* and G3*n* are advanced. That is, delay adjusting unit 112*bu*8 controls the delay lines 112*bu*9 and 112*bu*10 so as to decrease the delay times of the delay lines 112*bu*9 and 112*bu*10.

Accordingly, the delay adjusting unit 112*bu*8 can approximate the time at which the output voltage Vs of the U-phase main circuit 12*bu* is changed to a high level to the time at which the output voltage Vm of the U-phase main circuit 12*au* is changed to a high level. As a result, the delay adjusting unit 112*bu*8 can decrease the circulation current component of the current Is.

As illustrated in the fourth row of the table 80 in FIG. 13, in a state in which the increasing direction of the circulation current component of the current Is is a negative direction and the amplitude of the circulation current component of the current Is is greater than the negative threshold value when the gate signal G3*p* is changed from a high level to a low level, the output voltage Vs of the U-phase main circuit 12*bu* is earlier changed to a low level than the output voltage Vm of the U-phase main circuit 12*au* is changed to a low level. Accordingly, the delay adjusting unit 112*bu*8 controls the delay lines 112*bu*9 and 112*bu*10 in the direction in which the phases of the gate signals G3*p* and G3*n* are delayed. That is, delay adjusting unit 112*bu*8 controls the delay lines 112*bu*9 and 112*bu*10 so as to increase the delay times of the delay lines 112*bu*9 and 112*bu*10.

Accordingly, the delay adjusting unit 112*bu*8 can approximate the time at which the output voltage Vs of the U-phase main circuit 12*bu* is changed to a high level to the time at which the output voltage Vm of the U-phase main circuit 12*au* is changed to a high level. As a result, the delay adjusting unit 112*bu*8 can decrease the circulation current component of the current Is.

Figure 14:
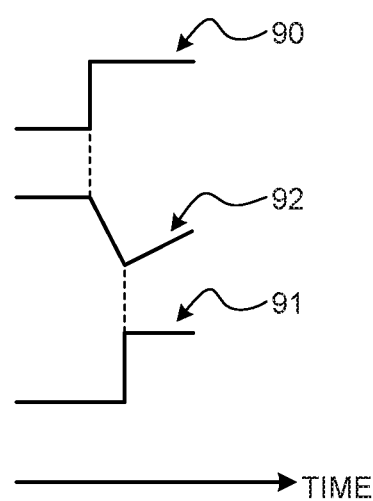
FIG. 14 is a timing diagram illustrating an effect resulting from the U-phase gate timing adjusting circuit.

FIGS. 14 to 17 are timing diagrams illustrating effects resulting from the U-phase gate timing adjusting circuit. In FIG. 14, the changing time of the output voltage 91 of the U-phase main circuit 12*bu* from a low level to a high level is delayed with respect to the changing time of the output voltage 90 of the U-phase main circuit 12*au* from a low level to a high level and the circulation current component 92 of the current Is flows in the negative direction.

Figure 15:
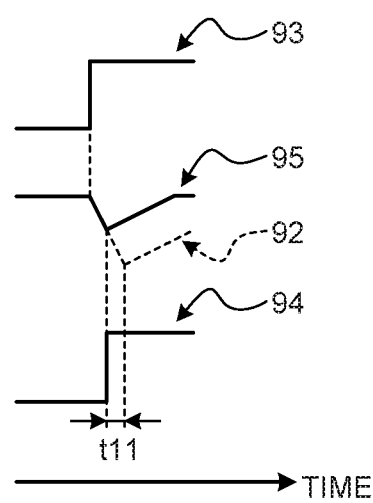
FIG. 15 is a timing diagram illustrating an effect resulting from the U-phase gate timing adjusting circuit.

At a next switching timing, when the U-phase gate timing adjusting circuit 112*bu* advances the timings of the gate signals G3*p* and G3*n* by time t11 as illustrated in FIG. 15, the switching timings of the switching elements 12*bu*1 and l2*bu*2 are also advanced by time t11. Accordingly, the U-phase gate timing adjusting circuit 112*bu* can approximate the changing time of the output voltage 94 of the U-phase main circuit 12*bu* from a low level to a high level to the changing time of the output voltage 93 of the U-phase main circuit 12*au* from a low level to a high level and can decrease the circulation current component 95 of the current Is.

As described above, the U-phase gate timing adjusting circuit 112*bu* repeatedly performs the gate timing adjusting operation with a predetermined cycle. Accordingly, the U-phase gate timing adjusting circuit 112*bu* can slowly decrease the circulation current component 95 of the current Is.

In FIG. 16, the changing time of the output voltage 97 of the U-phase main circuit 12*bu* from a low level to a high level is advanced with respect to the changing time of the output voltage 96 of the U-phase main circuit 12*au* from a low level to a high level and the circulation current component 98 of the current Is flows in the positive direction.

At a next switching timing, when the U-phase gate, timing adjusting circuit 112*bu* delays the timings of the gate signals G3*p* and G3*n* by time t12 as illustrated in FIG. 17, the switching timings of the switching elements 12*bu*1 and 12*bu*2 are also delayed by time t12. Accordingly, the U-phase gate timing adjusting circuit 112*bu* can approximate the changing time of the output voltage 100 of the U-phase main circuit 12*bu* from a low level to a high level to the changing time of the output voltage 99 of the U-phase main circuit 12*au* from a low level to a high level and can decrease the circulation current component 101 of the current Is.

As described above, the U-phase gate timing adjusting circuit 112*bu* repeatedly performs the gate timing adjusting operation with a predetermined cycle.4 Accordingly, the U-phase gate timing adjusting circuit 112*bu* can slowly decrease the circulation current component 101 of the current Is.

According to the second control, the slave semiconductor power conversion devices 1*b* and 1*c* can adjust the switching timing of the switching elements 12*bu*1 and 12*bu*2 on the basis of the circulation current of the corresponding semiconductor power conversion devices. Accordingly, the slave semiconductor power conversion devices 1*b* and 1*c* can reduce the circulation current of the corresponding semiconductor power conversion devices.

The second control can be independently performed by the slave semiconductor power conversion devices 1b and 1c without communicating with another semiconductor power conversion device. Accordingly, the second control does not cause limitation of an arrangement of wires or the like. In second control, it is not necessary to calculate a current difference between the semiconductor power conversion devices. In the second control, it is not necessary to include a current sensor in the master semiconductor power conversion device 1a.

The first control and the second control can independently exhibit the above-mentioned effects. However, when the first control along is performed and a factor for damaging the switching timing synchronization of the switching elements is present in circuits in a stage subsequent to the time counters 113a and 113b, it is difficult to reduce the circulation current. Examples of the case in which a factor for damaging the switching timing synchronization of the switching elements is present in circuits in a stage subsequent to the time counters 113a and 113b include cases in which the switching elements 12au1, 12au2, 12bu1, and 12bu2 or circuits for driving the switching elements have individual differences or have characteristic variations due to an ambient environment such as a temperature.

When the second control alone is performed and the deviation of the switching timings of the switching elements 12au1, 12au2, 12bu1, and 12bu2 is small, it is considered that the circulation current can be slowly decreased and reduced. However, when the deviation of the switching timings of the switching elements 12au1, 12au2, 12bu1, and 12bu2 is large, there is a possibility that the circulation current will not be decreased but the circulation current will diverge.

Therefore, the semiconductor power conversion system 1 illustrated in FIG. 1 can exhibit a synergic effect which cannot be achieved only by the first control operation or only by the second control operation by means of combining the first control and the second control operations.

That is, the semiconductor power conversion system 1 can synchronize the phase of the triangular wave generator 114a and the phase of the triangular wave generator 114b through the first control. Accordingly, the semiconductor power conversion system 1 can reduce the deviation of the switching timings of the switching elements 12au1, 12au2, 12bu1, and 12bu2. When performing the second control, the semiconductor power conversion system 1 exhibits a synergic effect that the circulation current can be reduced without diverging, because the deviation of the switching timings of the switching elements 12au1, 12au2, 12bu1, and 12bu2 is reduced by the first control.

Note that, in the first embodiment, the switching elements 12au1, 12au2, 12bu1, and 12bu2 and the diodes 12au3, 12au4, 12bu3, and 12bu4 are generally formed of Si-based semiconductor containing silicon (Si), but may be formed of a wide-bandgap semiconductor containing silicon carbide (SiC), gallium nitride (GaN), or diamond.

The switching elements and the diodes formed of the wide-bandgap semiconductor have a high breakdown voltage and a high allowable current density. Accordingly, it is possible to implement a smaller-sized power semiconductor module and to decrease the sizes of the semiconductor power conversion devices 1a, 1b, and 1c using the smaller-sized power semiconductor module.

The switching elements and the diodes formed of the wide-bandgap semiconductor have high heat resistance.

Accordingly, since the heat-dissipating pins of heat sinks of the semiconductor power conversion devices 1a, 1b, and 1c can be decreased in size, it is possible to further decrease the sizes of the semiconductor power conversion devices 1a, 1b, and 1c.

The switching elements and the diodes formed of the wide-bandgap semiconductor have low power loss. Accordingly, it is possible to enhance the efficiency of the switching elements and the diodes and thus to enhance the efficiency of the power semiconductor module and the semiconductor power conversion devices 1a, 1b, and 1c.

When the switching elements 12au1, 12au2, 12bu1, and 12bu2 and the diodes 12au3, 12au4, 12bu3, and 12bu4 are formed of wide-bandgap semiconductor, the switching speed is high and it is thus possible to make the frequency of the carrier wave high. Accordingly, it is possible to make a timing adjustment resolution of the gate timing adjusting circuit 112b minute, thereby enabling the parallel operation with higher accuracy.

Each of the semiconductor power conversion devices 1a, 1b, and 1c may include a controller 111a, a delay circuit 112a, a controller 111b, and a gate timing adjusting circuit 112b. The semiconductor power conversion devices 1a, 1b, and 1c may be set to a master or a slave on the basis of a mechanical switch, an electrical signal, or the like. When each of the semiconductor power conversion devices 1a, 1b, and 1c is set to a master, the controller 111a and the delay circuit 112a are activated. When each of the semiconductor power conversion devices 1a, 1b, and 1c is set to a slave, the controller 111b and the gate timing adjusting circuit 112b are activated.

Accordingly, it is possible to implement the semiconductor power conversion system 1 by only manufacturing one type of semiconductor power conversion devices. As a result it is possible to achieve commonization of components, commonization of manufacturing steps, and facilitation of inventory control so as to achieve a decrease in cost.

Second Embodiment

Figure 18:
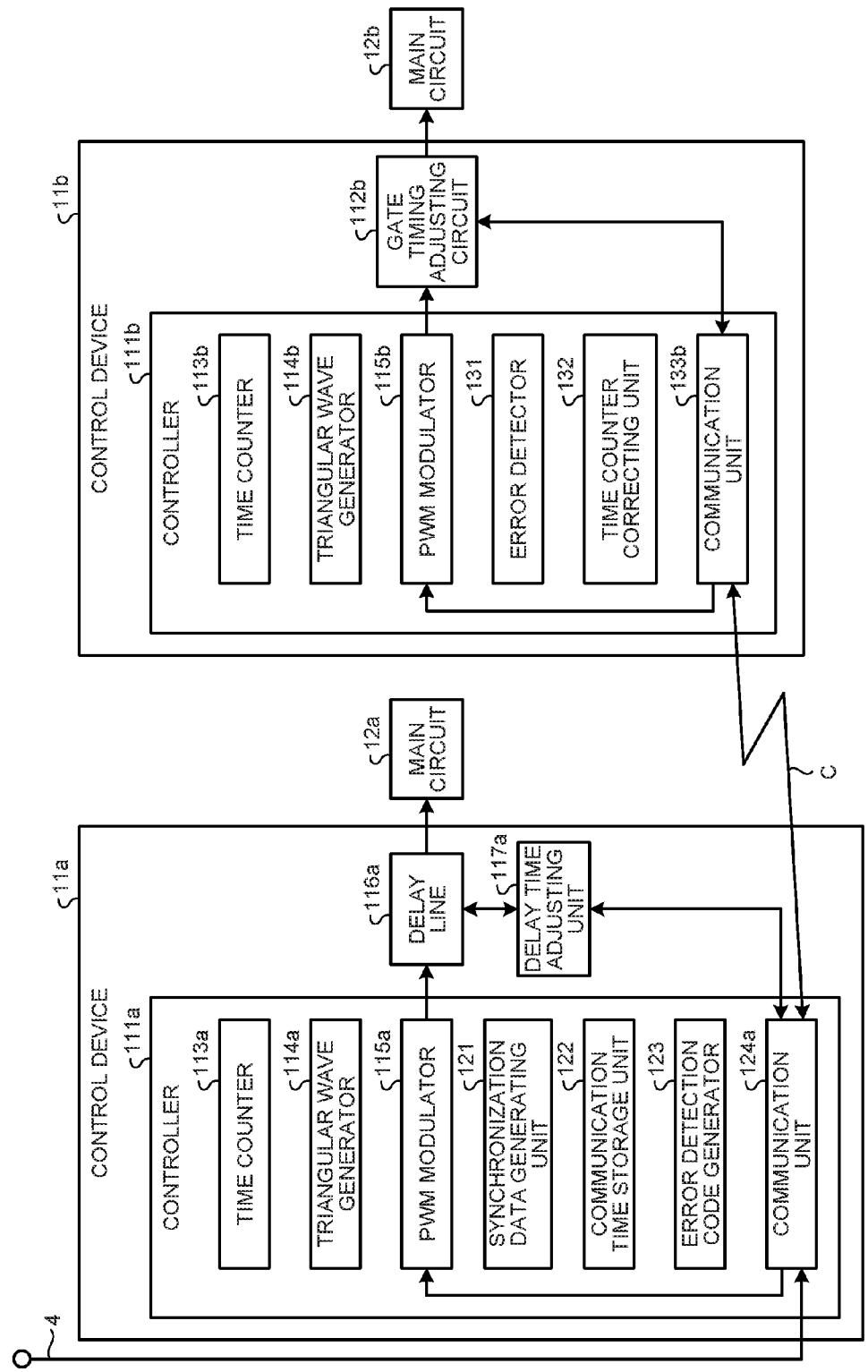
FIG. 18 is functional block diagram illustrating a configuration of a semiconductor power conversion system according to a second embodiment of the present invention.

FIG. 18 is a functional block diagram illustrating a configuration of a semiconductor power conversion system according to a second embodiment of the present invention. In the second embodiment, a control device 11a of a master semiconductor power conversion device 1a includes a controller 111a, a delay line 116a, and a delay time adjusting unit 117a. The delay line 116a can have a delay time of 0 to T, in a manner similar to the delay lines 112bu9 and 112bu10 of slave semiconductor power conversion devices 1b and 1c see FIG. 9). The delay time of the delay line 116a is set to a half of T in the initial stage.

A gate timing adjusting circuits 112b of the slave semiconductor power conversion devices 1b and 1c send the delay times of the delay lines 112bu9 and 112bu10 of the corresponding slave semiconductor power conversion devices to communication units 133b at a predetermined timing or with a predetermined cycle. The communication units 133b transmit the delay times received from the gate timing adjusting circuits 112b to a communication unit 124a of the master semiconductor power conversion device 1a via the communication line C. The communication unit 124a sends the delay times received from the slave semiconductor power conversion devices 1b and 1c to the delay time adjusting unit 117a. The delay time adjusting unit 117a receives the delay times from the delay line 116a at a predetermined timing or with a predetermined cycle.

The delay time adjusting unit 117a adjusts the delay time of the delay line 116a of the master semiconductor power conversion device 1a and the delay times of the delay lines 112bu9 and 112bu10 of the slave semiconductor power conversion devices 1b and 1c at a predetermined timing or with a predetermined cycle.

Figure 19:
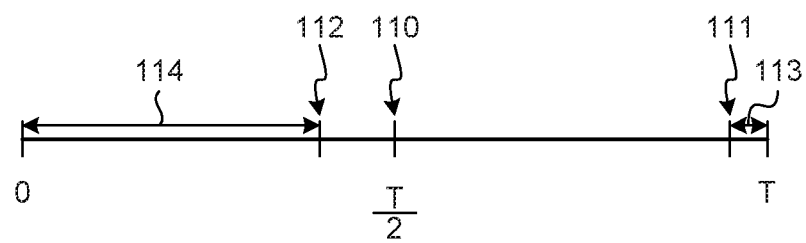
FIG. 19 is a diagram illustrating an example of a delay time of a semiconductor power conversion device.

FIG. 19 is a diagram illustrating an example of a delay time of a semiconductor power conversion device. The delay time 110 of the delay line 116a of the master semiconductor power conversion device 1a is set to a half of T. The delay time 111 of the delay lines 112bu9 and 112bu10 of the slave semiconductor power conversion, device 1b is set to be greater than the delay time 110 of the delay line 116a of the master semiconductor power conversion device 1a by the gate timing adjusting circuits 112b, The delay time 112 of the delay lines 112bu9 and 112bu10 of the slave semiconductor power conversion device 1c is set to be smaller than the delay time 110 of the delay line 116a of the master semiconductor power conversion device 1a by the gate timing adjusting circuits 112b.

Here, the delay time 111 of the delay lines 112bu9 and 112bu10 of the slave semiconductor power conversion device 1b is set to much greater than the delay time 110 of the master semiconductor power conversion device 1a. Accordingly, a margin 113 capable of increasing the delay time 111 of the delay lines 112bu9 and 112bu10 of the slave semiconductor power conversion device 1b is very small. That is, the adjustment margin of the delay lines 112bu9 and 112bu10 of the slave semiconductor power conversion device 1b is set to very small.

On the other hand, the delay time 112 of the delay lines 112bu9 and 112bu10 of the slave semiconductor power conversion device 1c is set to be slightly smaller than the delay time 110 of the master semiconductor power conversion device 1a. Accordingly, a margin 114 enabling a further decrease in the delay time 112 of the delay lines 112bu9 and 112bu10 of the slave semiconductor power conversion device 1c is set to be greater than the margin 113. That is, the adjustment margin of the delay lines 112bu9 and 112bu10 of the slave semiconductor power conversion device in 1c set to be great.

Therefore, the delay time adjusting unit 117a determines an adjustment width by which all the delay times of the semiconductor power conversion devices 1a, 1b, and 1c can be decreased or increased so as to increase the adjustment margin of the semiconductor power conversion device that has the smallest adjustment margin out of the semiconductor power conversion devices 1a, 1b, and 1c. When the adjustment width is determined, the delay time adjusting unit 117a adjusts the delay time of the delay line 116a and transmits the adjustment width to the slave semiconductor power conversion devices 1b and 1c. The gate timing adjusting circuit 112b of each of the slave semiconductor power conversion devices 1b and 1c adjusts the delay time of the delay lines 112bu9 and 112bu10 of the corresponding semiconductor power conversion device on the basis of the adjustment width received from the master semiconductor power conversion device 1a.

Figure 20:
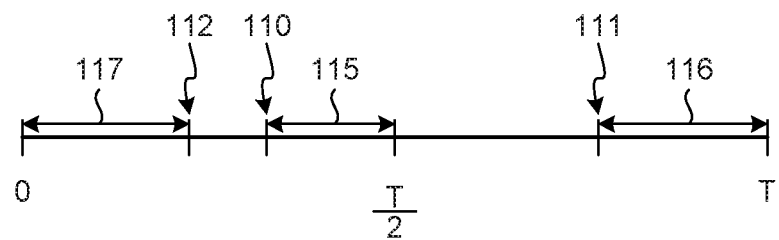
FIG. 20 is a diagram illustrating an example of a delay time after the semiconductor power conversion device has been adjusted.

FIG. 20 is a diagram illustrating an example of an adjusted delay time of a semiconductor power conversion device. In FIG. 19 which is described already above with reference, the margin 113 enabling a further increase in the delay time 111 of the slave semiconductor power conversion device 1b is set to be very small. Accordingly, the delay time adjusting unit 117a determines the adjustment width 115 so as to decrease the delay times of the semiconductor power conversion devices 1a, 1b, and 1c.

The delay time 110 of the master semiconductor power conversion device 1a is set to be smaller by the adjustment width 115. In a similar manner, the delay time 111 of the slave semiconductor power conversion device 1b is set to be smaller by the adjustment width 115. As a result, a margin 116 enabling an increase in the delay time 111 of the slave semiconductor power conversion device 1b is obtained by adding the adjustment width 115 to the non-adjusted margin 113.

The delay time 112 of the slave semiconductor power conversion device 1c is set to be smaller by the adjustment width 115. As a result, a margin 117 enabling a decrease in the delay time 112 of the slave semiconductor power conversion device 1c is obtained by subtracting the adjustment width 115 from the non-adjusted margin 114.

The delay time adjusting unit 117a can determine the adjustment width such that the adjustment margin for further increasing the delay time of the semiconductor power conversion device having the greatest delay time out of the semiconductor power conversion devices 1a, 1b, and 1c is equal to the adjustment margin for further decreasing the delay time of the semiconductor power conversion device having the smallest delay time out of the semiconductor power conversion devices 1a, 1b, and 1c.

Referring to FIG. 20, the delay time adjusting unit 117a can determine the adjustment width 115 such that the adjustment margin 116 for further increasing the delay time 111 of the semiconductor power conversion device 1b having the greatest delay rime out of the semiconductor power conversion devices 1a, 1b, and 1c is equal to the adjustment margin 117 for further decreasing the delay time 112 of the semiconductor power conversion device 1c having the smallest delay time out of the semiconductor power conversion devices 1a, 1b, and 1c. Accordingly, it is possible to balance the adjustment margin of the semiconductor power conversion device having the greatest delay time out of the semiconductor power conversion devices 1a, 1b, and 1c with the adjustment margin of the semiconductor power conversion device having the smallest delay time out of the semiconductor power conversion devices 1a, 1b, and 1c, thereby increasing the adjustment margin of the semiconductor power conversion system 1 as a whole.

REFERENCE SIGNS LIST

1 SEMICONDUCTOR POWER CONVERSION SYSTEM
1a, 1b, 1c SEMICONDUCTOR POWER CONVERSION DEVICE
   11a, 11b, 11c CONTROL DEVICE
   12a, 12b, 12c MAIN CIRCUIT
   111a, 111b CONTROLLER
   112a DELAY CIRCUIT
   112b GATE TIMING ADJUSTING CIRCUIT
   113a, 113b TIME COUNTER
   114a, 114b TRIANGULAR WAVE GENERATOR
   115a, 115b PWM MODULATOR
   121 SYNCHRONIZATION DATA GENERATING UNIT
   122 COMMUNICATION TIME STORAGE UNIT
   123 ERROR DETECTION CODE GENERATOR
   124 SYNCHRONIZATION DATA TRANSMITTING UNIT
   131 ERROR DETECTOR
   132 TIME COUNTER CORRECTING UNIT
   133 SYNCHRONIZATION DATA RECEIVING UNIT
   112au U-PHASE DELAY CIRCUIT

112*bu* U-PHASE GATE TIMING ADJUSTING CIRCUIT
12*au*, 12*bu* U-PHASE MAIN CIRCUIT
112*bu*1 BANDPASS FILTER
112*bu*8 DELAY ADJUSTING UNIT
112*bu*9, 112*bu*10, 116*a* DELAY LINE
117*a* DELAY TIME ADJUSTING UNIT
124*a*, 133*b* COMMUNICATION UNIT

The invention claimed is:

1. A power conversion system comprising a master power conversion device and one or more slave power conversion devices, wherein
the master power conversion device and the slave power conversion device output pulse width modulation (PWM) voltages to a load in parallel based on gate signals acquired by PWM-modulating the same voltage command value,
each of the master power conversion device and the slave power conversion device includes:
a time counter; and
a carrier wave generator that generates a carrier wave for PWM-modulating the voltage command value in synchronization with the time counter,
the master power conversion device further includes:
a synchronization data generator that, when the time counter of the master power conversion device reaches a predetermined value, generates synchronization data for synchronizing a value of the time counter of the slave power conversion device with the time counter of the master power conversion device; and
a communication interface that transmits the synchronization data to the slave power conversion device, and
the slave power conversion device further includes:
a communication interface that receives the synchronization data from the master power conversion device, the synchronization data including a communication time that indicates time required for communication between the master power conversion device and the slave power conversion device;
a time counter corrector that compares the value of the time counter of the slave power conversion device with the communication time to correct the value of the time counter of the slave power conversion device based on a result of the comparison when the communication interface of the slave power conversion device has completely received the synchronization data;
a current sensor that detects a current on an output side of the slave power conversion device; and
a gate timing adjuster that advances or delays a phase of the gate signal of the slave power conversion device based on a circulation current component of the current detected by the current sensor.

2. The power conversion system according to claim 1, wherein the gate timing adjuster
delays the phase of the gate signal when the gate signal is changed from a low level to a high level and amplitude of a circulation current component in a direction from the slave power conversion device to the outside is larger than a predetermined positive threshold value which is allowed in the circulation current component of the current,
advances the phase of the gate signal when the gate signal is changed from a low level to a high level and amplitude of a circulation current component in a direction from the outside to the slave power conversion device is larger than a predetermined negative threshold value which is allowed in the circulation current component of the current,
advances the phase of the gate signal when the gate signal is changed from a high level to a low level and amplitude of a circulation current component in a direction from the slave power conversion device to the outside is larger than the positive threshold value, and
delays the phase of the gate signal when the gate signal is changed from a high level to a low level and amplitude of a circulation current component in a direction from the outside to the slave power conversion device is larger than the negative threshold value.

3. The power conversion system according to claim 1, wherein
the gate timing adjuster increases a width by which the phase of the gate signal is advanced or delayed as the amplitude of the circulation current component increases.

4. The power conversion system according to claim 1, wherein
the gate timing adjuster includes a filter circuit that removes a noise component and a load current component flowing to the load from the current detected by the current sensor and that passes the circulation current component therethrough.

5. The power conversion system according to claim 1, wherein
the master power conversion device further includes:
a delay line that advances or delays the phase of the gate signal of the master power conversion device; and
a delay time adjuster that adjusts a delay time of the gate signal of the master power conversion device and a delay time of the gate signal of the one or more slave power conversion devices,
the gate timing adjuster includes a delay line that advances or delays the phase of the gate signal of the slave power conversion device,
the communication interface of the slave power conversion device transmits the delay time of the delay line of the slave power conversion device to the delay time adjuster, and
the delay time adjuster
determines an adjustment width by which to equally decrease or equally increase the delay times of the delay lines of all the power conversion devices such that an adjustment margin of the power conversion device having the smallest adjustment margin of the delay line out of all the power conversion devices increases based on the delay times of the delay lines of all the power conversion devices,
sets the adjustment width for the delay line of the master power conversion device, and
transmits the adjustment width to the gate timing adjuster of the one or more slave power conversion devices.

6. The power conversion system according to claim 5, wherein
the delay time adjuster determines the adjustment width such that the adjustment margin for further increasing the delay time of the delay line of the power conversion device having the largest delay time of the delay line out of all the power conversion devices is equal to the adjustment margin for further decreasing the delay time of the delay line of the power conversion device having the smallest delay time of the delay line out of all the power conversion devices.

7. The power conversion system according to claim 1, wherein
each of the power conversion device includes a switching element that outputs a PWM voltage by switching based on the gate signal, and
the switching element is a wide-bandgap semiconductor element.

8. A power conversion system comprising a master power conversion device and one or more slave power conversion devices, wherein
the master power conversion device and the slave power conversion device output pulse width modulation (PWM) voltages in parallel to a load based on gate signals acquired by PWM-modulating the same voltage command value, and
each slave power conversion device includes:
a switching element that outputs a PWM voltage by performing a switching operation based on the gate signal; and
a control device that
determines whether a time counter value of the salve power conversion device is equal to a communication time required for communication between the master power conversion device and the slave power conversion device,
in response to the time counter value, being different from the communication time and a circulation current component of an output current of the slave power conversion device being greater than a predetermined threshold value at a first switching operation of the switching element, performs control of advancing or delaying the gate signal of the slave power conversion device such that a time at which a voltage on an output side of the slave power conversion device changes approaches a time at which a voltage on an output side of another power conversion device of the slave power conversion devices changes at a second switching operation that is subsequent to the first switching operation, and makes a circulation current component of an output current from the slave power conversion device at the second switching operation less than a circulation current component of an output current from the slave power conversion device at the first switching operation.

9. A power conversion device that outputs a pulse width modulation (PWM) voltage to a load in parallel with a master power conversion device based on a gate signal acquired by PWM-modulating the same voltage command value as the master power conversion device, the power conversion device comprising:

a time counter;
a carrier wave generator that generates a carrier wave for PWM-modulating the voltage command value in synchronization with the time counter;
a communication interface that receives synchronization data for synchronizing a value of the time counter with the time counter of the master power conversion device from the master power conversion device when the time counter of the master power conversion device reaches a predetermined value, the synchronization data including a communication time that indicates time required for communication between the communication interface and the master power conversion device;
a time counter corrector that compares the value of the time counter with the communication time to correct the value of the time counter based on a result of comparison when the communication interface completely receives the synchronization data;
a current sensor that detects a current on an output side; and
a gate timing adjuster that advances or delays a phase of the gate signal based on a circulation current component of the current detected by the current sensor.

10. A power conversion device that outputs a pulse width modulation (PWM) voltage to a load in parallel with a master power conversion device based on a gate signal acquired by PWM-modulating the same voltage command value as that of the master power conversion device, the power conversion device comprising:
a switching element that outputs a PWM voltage by performing a switching operation based on the gate signal; and
a control device that
determines whether a time counter value of the power conversion device is equal to a communication time required for communication between the power conversion device and the master power conversion device,
in response to the time counter value being different from the communication time and a circulation current component of an output current being greater than a predetermined threshold value at a first switching operation of the switching element, performs control of advancing or delaying the gate signal such that a time at which a voltage on an output side changes approaches a time at which a voltage on an output side of another power conversion device changes at a second switching operation that is subsequent to the first switching operation, and makes a circulation current component of the output current at the second switching operation less than a circulation current component of the output current at the first switching operation.

* * * * *